US012604103B2

(12) United States Patent　　　　　(10) Patent No.:　US 12,604,103 B2
Yang et al.　　　　　　　　　　　　　(45) Date of Patent:　　Apr. 14, 2026

(54) MULTI-FACTOR ASSESSMENT TO DETECT IMAGE CAPTURE DEVICE SMUDGES AND CORRESPONDING ELECTRONIC DEVICES AND METHODS

(71) Applicant: Motorola Mobility LLC, Chicago, IL (US)

(72) Inventors: Emily Yang, Chicago, IL (US); John Pincenti, Chicago, IL (US)

(73) Assignee: Motorola Mobility LLC, Chicago, IL (US)

( * ) Notice:　Subject to any disclaimer, the term of this patent is extended or adjusted under 35 U.S.C. 154(b) by 62 days.

(21) Appl. No.: 18/661,142

(22) Filed:　　May 10, 2024

(65)　　　　　　Prior Publication Data

US 2025/0350850 A1　　Nov. 13, 2025

(51) Int. Cl.
　　*H04N 23/81*　　　(2023.01)
　　*H04N 23/52*　　　(2023.01)
　　*H04N 23/63*　　　(2023.01)
　　*H04N 23/741*　　(2023.01)
(52) U.S. Cl.
　　CPC ........... *H04N 23/811* (2023.01); *H04N 23/52* (2023.01); *H04N 23/632* (2023.01); *H04N 23/741* (2023.01)
(58) Field of Classification Search
　　CPC .... H04N 23/811; H04N 23/52; H04N 23/632; H04N 23/741
　　See application file for complete search history.

(56)　　　　　　References Cited

U.S. PATENT DOCUMENTS 6,940,554 B2　　9/2005　Robins
9,098,124 B2　　8/2015　Holenarsipur
10,191,356 B2　　1/2019　Laroia
　　　　　　　　(Continued)

FOREIGN PATENT DOCUMENTS

CN　　　112583999　　　3/2024
JP　　　2005117262　　　4/2005
　　　　　　　(Continued)

OTHER PUBLICATIONS

"How Flaw Detection feature works on Galaxy mobile devices", Published Sep. 17, 2020; Available online at https://www.samsung.com/in/support/mobile-devices/how-flaw-detection-feature-work-on-galaxy-mobile-devices/.

(Continued)

*Primary Examiner* — Timothy J Henn
(74) *Attorney, Agent, or Firm* — Philip H. Burrus, IV

(57)　　　　　　ABSTRACT

The present disclosure relates to a method implemented in an electronic device for detecting and notifying users about the cleanliness of an image capture device cover. The method includes determining, using one or more processors, whether the image capture device cover is smudged by assessing multiple factors, including measuring the pressure applied to the cover. When the assessment indicates that the cover is smudged, the method causes the user interface of the electronic device to present indicia indicating the smudged condition. The method further includes detecting a cleaning operation on the cover and, in response, altering the indicia to reflect the cleaned condition. The method combines hardware and software components to provide an efficient and user-friendly solution for maintaining the cleanliness of the image capture device cover.

20 Claims, 16 Drawing Sheets

(56) References Cited

U.S. PATENT DOCUMENTS

| | | | | |
|---|---|---|---|---|
| 10,623,640 | B2 | 4/2020 | Akkala | |
| 2003/0193604 | A1* | 10/2003 | Robins | G02B 27/0006 |
| | | | | 348/335 |
| 2012/0013708 | A1* | 1/2012 | Okubo | H04N 13/239 |
| | | | | 348/43 |
| 2012/0295665 | A1 | 11/2012 | Pantfoerder | |
| 2013/0208164 | A1* | 8/2013 | Cazier | H04N 25/61 |
| | | | | 348/333.04 |
| 2014/0191110 | A1 | 7/2014 | Holenarsipur | |
| 2015/0036037 | A1* | 2/2015 | Reed | G03B 17/02 |
| | | | | 348/340 |
| 2017/0180637 | A1* | 6/2017 | Lautenbach | H04N 23/63 |
| 2019/0132530 | A1* | 5/2019 | Cheaz | G06T 7/0002 |
| 2020/0084389 | A1* | 3/2020 | Candelore | H04N 23/811 |
| 2024/0406526 | A1* | 12/2024 | Guo | G01S 7/497 |
| 2025/0131546 | A1* | 4/2025 | Chen | G06T 7/13 |

FOREIGN PATENT DOCUMENTS

| | | |
|---|---|---|
| JP | 2015070566 | 4/2015 |
| JP | 2018197666 | 12/2018 |
| TW | I779948 | 10/2022 |

OTHER PUBLICATIONS

Lepisto, , "Blemish detection in camera production testing using fast difference filtering", Published Apr. 1, 2009; available online at https://www.spiedigitallibrary.org/journals/journal-of-electronic-imaging/volume-18/issue-02/020501/Blemish-detection-in-camera-production-testing-using-fast-difference-filtering/10.1117/1.3132004.full#_=.

* cited by examiner

302

302

TOUCH SENSOR          301

302          CAMERA STATS

MOTION/ ORIENTATION/ GRAVITY/ INERTIA          303

DETERMINE SMUDGE USING MULTI-FACTOR ANALYSIS          1701

PRESENT INDICIA ON USER INTERFACE          1702

CLEANING OPERATION OCCUR?          1703

N

Y

ALTER/REMOVE INDICIA ON USER INTERFACE          1704

OPTIONALLY UPDATE LONG/SHORT MEMORY DATA          1705

1700

-- PRIOR ART --

MULTI-FACTOR ASSESSMENT TO DETECT IMAGE CAPTURE DEVICE SMUDGES AND CORRESPONDING ELECTRONIC DEVICES AND METHODS

BACKGROUND

Technical Field

This disclosure relates generally to electronic devices, and more particularly to electronic devices having image capture devices.

Background Art

The use of portable electronic devices, such as smartphones and tablet computers, has become ubiquitous. With increasing computational power, the owners of such devices use the same not only to communicate with others, but also to manage financial accounts, track health information, manage calendaring and address book data, watch television shows and movies, interact with social media sites, engage in on-line commerce, and surf the web.

Most of these electronic devices include some form of image capture device, which may include one or more cameras. In addition to being able to capture still images, these image capture devices can also be used to capture multiple, sequential frames in the form of video. As the quality of these cameras has improved, people are increasingly using the image capture devices in smartphones and tablet computers as their primary image and image capture device, eschewing traditional (and larger) stand-alone cameras such as single-lens-reflex cameras. It would be advantageous to have methods and systems to make the image capture devices of portable electronic devices perform even more optimally so as to increase the quality of captured images and video frames.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present disclosure.

Figure 1:
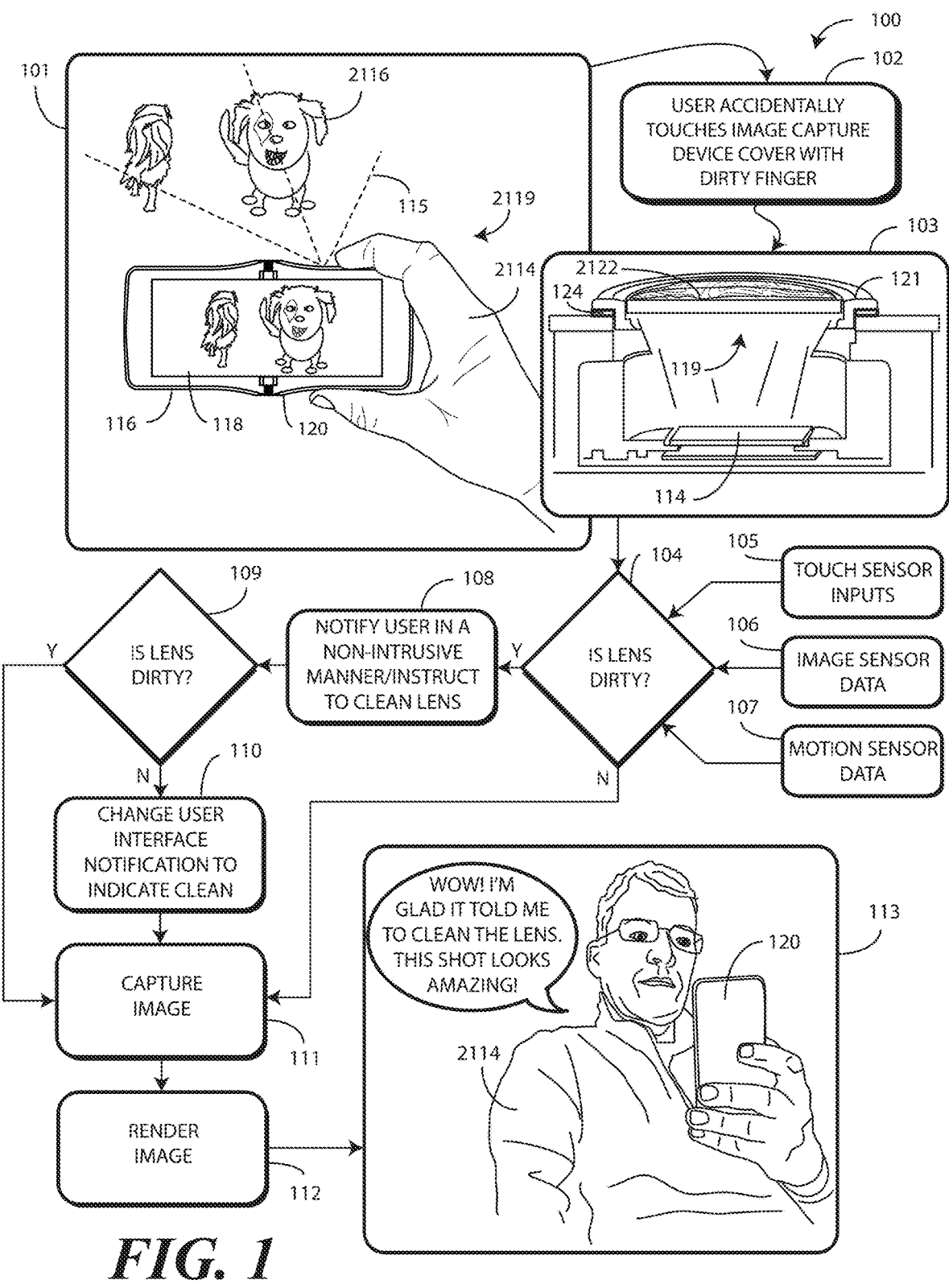
FIG. 1 illustrates one explanatory method in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to determining, by one or more processors of an electronic device, that an image capture device cover is smudged using a multi-factor assessment with at least one factor of the multi-factor assessment of the multi-factor assessment comprising a measurement of pressure applied to the image capture device cover and, when the multi-factor assessment indicates that the image capture device cover is smudged, causing a user interface of the electronic device to present indicia indicating that the image capture device cover is smudged. Any process descriptions or blocks in flow charts should be understood as representing modules, segments, or portions of code which include one or more executable instructions for implementing specific logical functions or steps in the process.

Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

Embodiments of the disclosure do not recite the implementation of any commonplace business method aimed at processing business information, nor do they apply a known business process to the particular technological environment of the Internet. Moreover, embodiments of the disclosure do not create or alter contractual relations using generic computer functions and conventional network operations. Quite to the contrary, embodiments of the disclosure employ methods that, when applied to electronic device and/or user interface technology, improve the functioning of the electronic device itself by and improving the overall user experience to overcome problems specifically arising in the realm of the technology associated with electronic device user interaction.

It will be appreciated that embodiments of the disclosure described herein may be comprised of one or more conventional processors and unique stored program instructions that control the one or more processors to implement, in conjunction with certain non-processor circuits, some, most, or all of the functions of, when one or more processors of an electronic device determine from signals from components such as an image capture device and a pressure sensor that an image capture device cover is smudged using a multi-factor assessment, causing a user interface to present indicia indicating that the image capture device cover is smudged as described herein. The non-processor circuits may include, but are not limited to, a radio receiver, a radio transmitter, signal drivers, clock circuits, power source circuits, and user input devices. As such, these functions may be interpreted as steps of a method to perform, when a multi-factor assessment indicates that an image capture device cover is smudged, presenting indicia indicating that the image capture device cover is smudged.

Alternatively, some or all functions could be implemented by a state machine that has no stored program instructions, or in one or more application specific integrated circuits (ASICs), in which each function or some combination of certain functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ASICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions.

As used herein, components may be "operatively coupled" when information can be sent between such components, even though there may be one or more intermediate or intervening components between, or along the connection path. The terms "substantially," "essentially," "approximately," "about," or any other version thereof, are defined as being close to as understood by one of ordinary skill in the art, and in one non-limiting embodiment the term is defined to be within ten percent, in another embodiment within five percent, in another embodiment within one percent and in another embodiment within one-half percent.

The term "coupled" as used herein is defined as connected, although not necessarily directly and not necessarily mechanically. Also, reference designators shown herein in parenthesis indicate components shown in a figure other than the one in discussion. For example, talking about a device (10) while discussing figure A would refer to an element, 10, shown in figure other than figure A.

Embodiments of the disclosure provide a solution to the problem of dirty camera lenses, or image capture device covers, in mobile devices such as smartphones, tablet computers, and other similar electronic devices. Embodiments of the disclosure contemplate that a smudged image capture device cover is a leading cause of poor image quality in captured images. Moreover, routine usage of mobile devices, such as touching the lens with fingers, often results in smudges and fingerprints on the image capture device cover surface. These smudges can lead to blurry images and veiling glare, either or both of which reduces image contrast and produces hazy quality images.

Embodiments of the disclosure contemplate that the industry has attempted to solve this problem with hardware solutions. Some have tried to create optical smudge detectors, while others have tried software solutions that manipulate image data to mitigate problems associated with smudging. However, these solutions have limitations and may not provide accurate smudge detection.

Advantageously, embodiments of the disclosure address this problem by combining hardware and software components to create a comprehensive solution that alerts a user, gently and in a non-intrusive manner, that the image capture device cover may be, or is, smudged. In one or more embodiments, a multi-factor assessment involves two or more of a touch sensor capable of detecting if the camera lens has been touched, image statistics from the camera, and input from inertial measurement units, gyroscopes, accelerometers, or other motion detecting devices. In one or more embodiments, these inputs are fed into a decision algorithm that analyzes the data and determines if the lens is dirty or potentially dirty. In one or more embodiments, the algorithm also detects if a user has cleaned the lens and notifies the user in a nonintrusive and friendly manner.

Figures 3, 4:
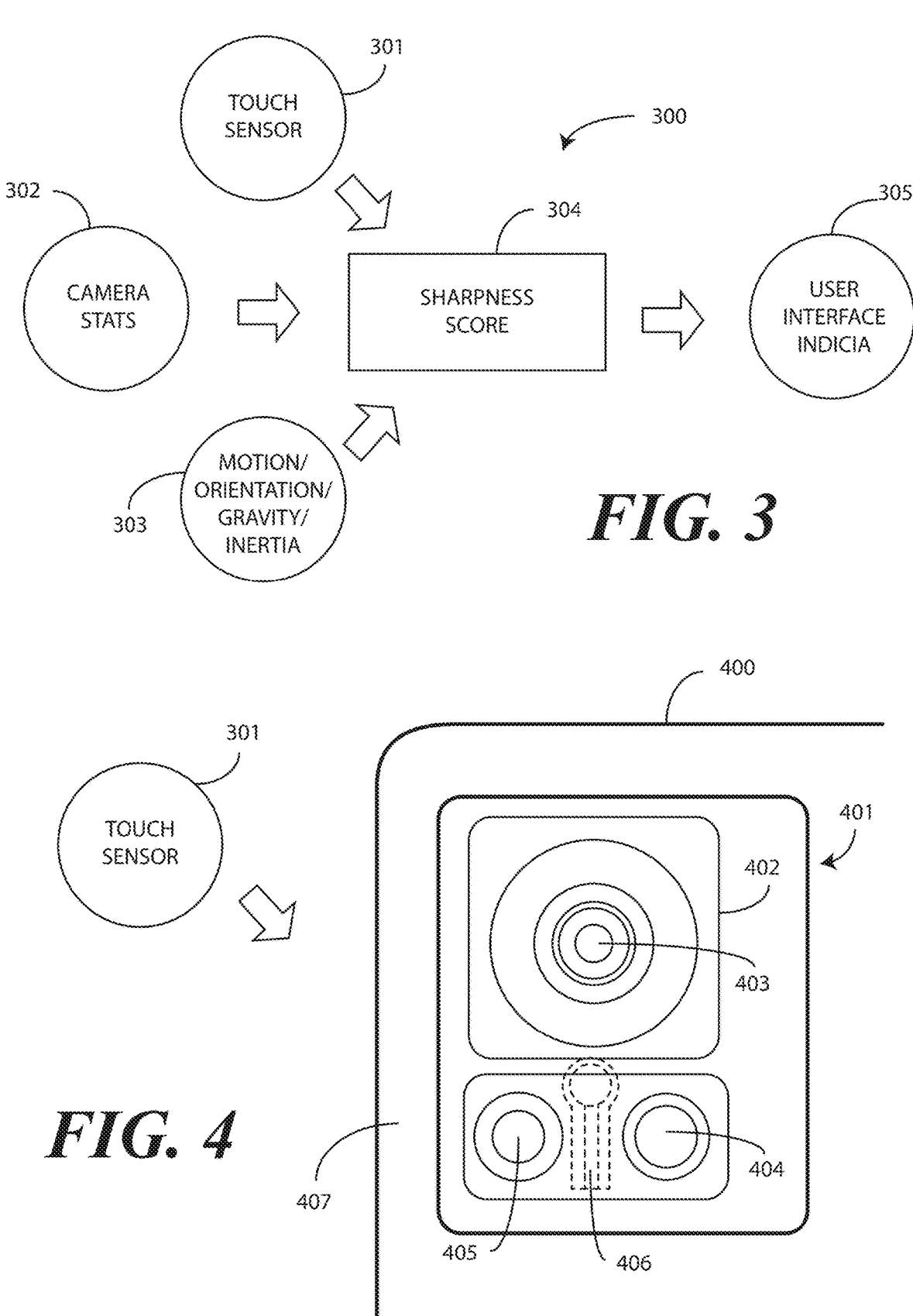
FIG. 3 illustrates one explanatory system in accordance with one or more embodiments of the disclosure.
FIG. 4 illustrates one explanatory touch sensor configuration in accordance with one or more embodiments of the disclosure.
Figure 5:
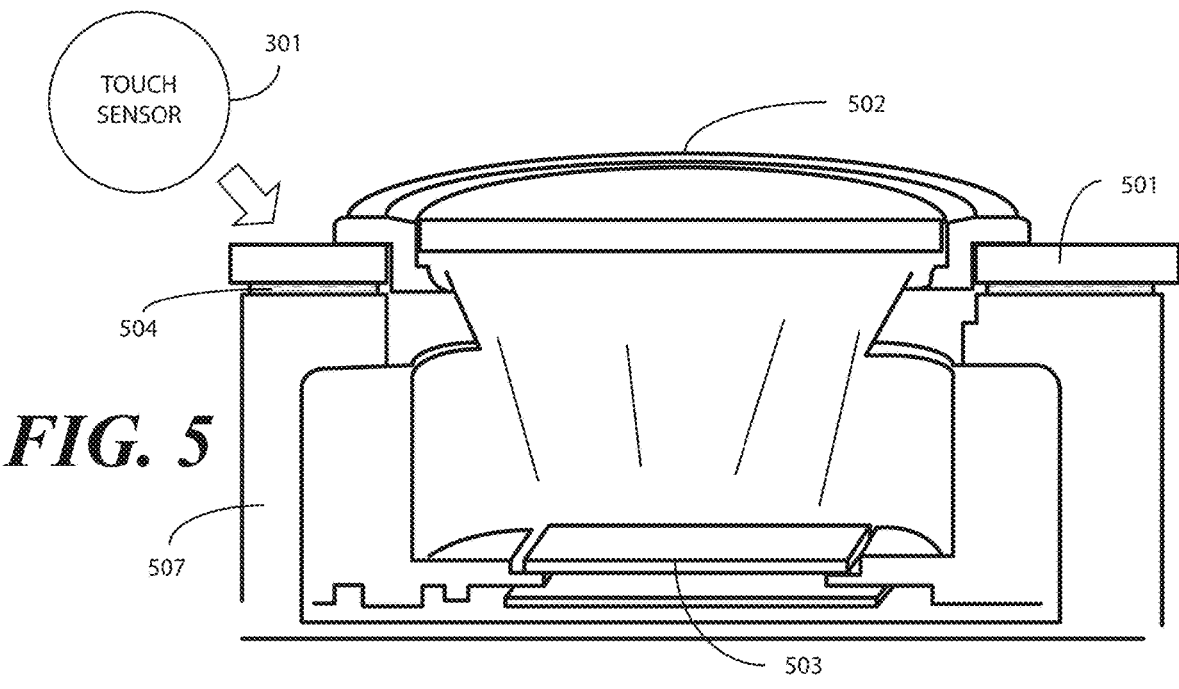
FIG. 5 illustrates an alternate touch sensor configuration in accordance with one or more embodiments of the disclosure.

In one or more embodiments, the touch sensor is configured to be thin and is placed between a device housing and the image capture device cover. In one or more embodiments, this thin design avoids adding "bump height" to the image capture device cover, while still being sensitive enough to detect minor lens touches from a short distance away. In one or more embodiments, the sensitivity requirement is determined based on the pressure felt by the sensor and the typical pressure of a finger press. FIGS. 4 and 5 provide renderings and considerations for wiring and alignment of the touch sensor.

Overall, embodiments of the disclosure provide an effective and user-friendly solution for detecting and notifying users about dirty camera lenses in mobile devices. By combining hardware and software components and utilizing various inputs, embodiments of the disclosure ensure accurate detection and timely notifications, improving the image quality and user experience of mobile device cameras.

In one or more embodiments, a method in an electronic device comprises determining, by one or more processors, that an image capture device cover is smudged using a multi-factor assessment. In one or more embodiments, at least one factor of the multi-factor assessment comprises a measurement of pressure applied to the image capture device cover. In one or more embodiments, when the multi-factor assessment indicates the image capture device cover is smudged, the one or more processors cause a user interface of the electronic device to present indicia indicating that the image capture device cover is smudged.

Advantageously, embodiments of the disclosure provide a combination of hardware and software components to detect and notify users about the cleanliness of an image capture device cover. Utilizing the multi-factor assessment, which can include measuring the pressure applied to the cover, embodiments of the disclosure determine if the cover is smudged. This approach provides an efficient and user-friendly solution for maintaining the cleanliness of the image capture device cover. Additionally, embodiments of the disclosure incorporate various image capture device statistics, motion data, and other factors to enhance the accuracy of the detection process.

In one or more embodiments, an electronic device comprises a device housing defining at least one aperture, an image capture device situated within the device housing and having a field of view through the at least one aperture, and an image capture device cover coupled to the device housing and spanning the at least one aperture. In one or more embodiments, the electronic device comprises a pressure sensor positioned between the image capture device cover and the device housing, as well as one or more processors and a user interface.

In one or more embodiments, when the one or more processors determine, from signals from both the image capture device and the pressure sensor, whether the image capture device cover is smudged using a multi-factor assessment, the one or more processors cause the user interface of the electronic device to present indicia indicating that the image capture device cover is smudged.

In one or more embodiments, the indicia are subtle and non-intrusive into the image capture operation. Illustrating by example, in one or more embodiments the indicia indicating that the image capture device cover is smudged comprises a ring circumscribing a user actuation target that, when actuated, causes the image capture device situated beneath the image capture device cover to capture one or more images.

In one or more embodiments, embodiments of the disclosure can also determine that the image capture device cover has been cleaned using another multi-factor assessment comprising another measurement of pressure applied to the image capture device cover. In one or more embodiments, when the one or more processors detect that the image capture device cover has been cleaned, the one or more processors can remove the indicia from the user interface indicating that the image capture device cover is smudged or dirty.

In one or more embodiments, electronic devices implementing embodiments of the disclosure detect when the lens or image capture device cover of an image capture device is dirty. Embodiments of the disclosure can also detect if a user has cleaned it. As noted above, embodiments of the disclosure can notify the user if the lens is clean or dirty "politely," such as by adding a ring around a user actuation target used to capture images.

Systems described below employ a multi-factor assessment that receives signals from a touch sensor, camera statistics, inertial measurement units, optionally other factors, and a decision algorithm to generate a smudge prompt when the image capture device cover is smudged or dirty. In one or more embodiments, the touch sensor would be placed between the device housing and image capture device cover so that if someone touches the lenses, the pressure sensor can detect this touch. The touch input is used to indicate not only that the lens is probably dirty, but also to detect when the image capture device cover has been cleaned. In one or more embodiments, the touch sensor is placed around the perimeter or anywhere on the image capture device cover.

In some embodiments, camera statistics offer an alternate way to detect if the image capture device cover gets dirty. The modulation transfer function (MTF) in optics relates to just the lens and/or image capture device cover, while the specific frequency response (SFR) is for the whole camera, including the lens and/or image capture device cover and software. When fewer frequencies come through, it indicates a smudge. A content filter, specifically a high pass filter, can be used to see if high frequencies are coming through.

Dynamic range is also affected by smudges, as whites tend not to be as white and blacks not as black due to light leaking. The brightness of the black and the white is not as distinct when the image capture device cover is smudged, especially as one moves toward the edges, which can be observed in a histogram.

Flare detection can optionally be used in smudge detection and is accomplished by measuring flare with an algorithm. Inertial measurement units can be used for detecting motions like lifting and raising and are likely used in combination with camera statistics when a finger or cloth blocks out the image capture.

In one or more embodiments, embodiments of the disclosure involve using a combination of long- and short-term statistics. A single image capture frame would likely not accurately detect a smudge, but over a period of time and after looking at multiple images, embodiments of the disclosure are able to detect smudges. Long-term statistics could just be a factory calibration, while short-term statistics are updated after cleaning.

When indicia are presented on the user interface, in one or more embodiments the indicia are designed to be simple, not "in your face," and without precluding the picture-taking experience. Embodiments of the disclosure advantageously incorporate an image capture device cover located pressure sensor and multi-factor smudge detection, with at least one factor being pressure on the lens cover along with a combination of camera statistics. Embodiments of the disclosure can suggest that a cleaning operation be performed, confirming the same using a similar smudge detection process.

In one or more embodiments, a method in an electronic device comprises determining, by one or more processors from one or more sensors, that an image capture device cover is smudged using a multi-factor assessment. In one or more embodiments, the multi-factor assessment indicates that the image capture device cover is smudged, which causes the one or more processors to cause a user interface of the electronic device to present indicia indicating that the image capture device cover is smudged. In one or more embodiments, the method then detects a cleaning operation occurring at the image capture device cover and, in response to the cleaning operation, altering the indicia indicating that the image capture device cover is smudged.

Embodiments of the disclosure provide several advantages over prior art solutions. A primary advantage is improved image quality. By detecting and notifying users about the cleanliness of the image capture device cover, embodiments of the disclosure ensure that users can capture high-quality images without the interference of smudges or dirt on the lens.

Embodiments of the disclosure also result in a user-friendly experience. Embodiments of the disclosure provide a non-intrusive and polite notification system to inform users about the cleanliness of the lens. This user-friendly approach enhances the overall experience of using the electronic device.

Embodiments of the disclosure are efficient at detecting smudges. The combination of hardware (such as the touch sensor) and software (such as camera statistics and motion data) components allows for a comprehensive and accurate detection of smudges on the lens or image capture device cover. This ensures that users are promptly notified when the lens needs cleaning.

Embodiments of the disclosure also offer customization capabilities via settings. Embodiments of the disclosure can be designed to adapt to different user preferences and usage patterns. For example, embodiments of the disclosure can take into account factors such as the amount of time spent using the device or the GPS location to determine when to prompt the user to clean the lens or image capture device cover.

Moreover, embodiments of the disclosure offer seamless integration capabilities with existing devices. Embodiments of the disclosure can be seamlessly integrated into existing electronic devices with image capture capabilities, making it a practical and cost-effective solution for improving image quality. Overall, embodiments of the disclosure offer the advantages of enhanced image quality, a user-friendly experience, efficient detection, customizable settings, and seamless integration with existing technology. Other advantages will be described below. Still others will be obvious to those of ordinary skill in the art having the benefit of this disclosure.

Figure 21:
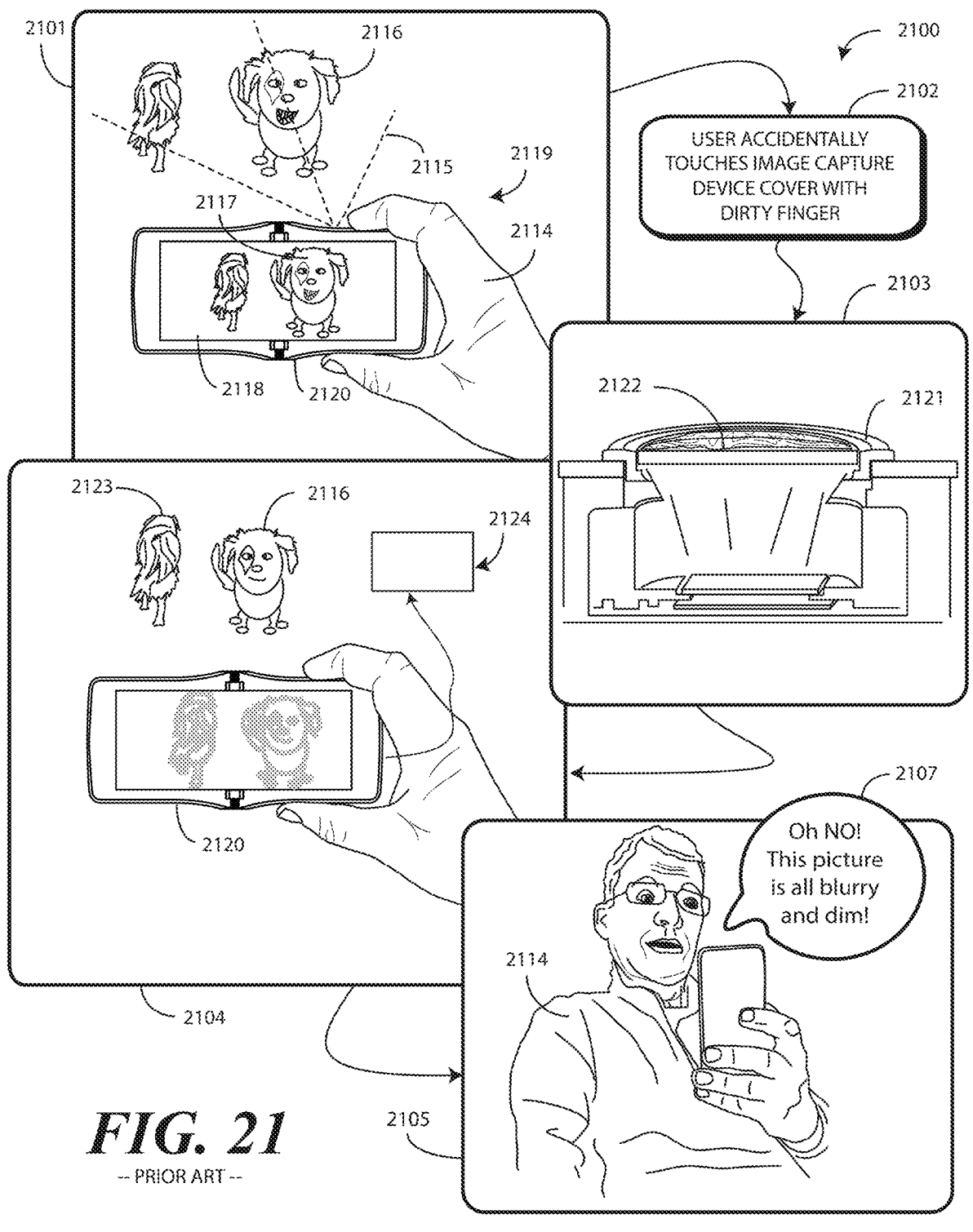
FIG. 21 illustrates a prior art method.

Turning first to FIG. 21, illustrated therein is a prior art method 2100 showing the problem solved by embodiments of the disclosure. At step 2101, a user 2114 of an electronic device 2120 is preparing to capture one or more images of his dog, Buster 2116, who is situated within an environment 2119 of the electronic device 2120. At step 2101, the electronic device 2120 is in a preview mode 2115, with a depiction 2117 of Buster 2116 being presented on the display 2118 of the electronic device 2120.

Unfortunately, prior to capturing the one or more images, at step 2102 the user accidentally touches the image capture device cover with a dirty finger. As Buster 2116 is a fan of Mac's world famous sauteed barramundi, the user 2114 has been feeding Buster 2116 samples of barramundi, which led to the desire of the user 2114 to obtain a clear representation of Buster 2116 enjoying these tasty morsels. Since Mac's restaurant uses copious amounts of butter when sautéing the barramundi, the user's touch at step 2202 has left butter 2122 all over the image capture device cover 2121, as shown at step 2103.

When the user 2114 captures the one or more images 2124 at step 2104 of Buster 2116 and his friend, Block 2123, the depictions set forth on the user interface are blurry and are not sharp at all. Sadly, this leaves the user 2114 to exclaim 2107 at step 2105, "Oh no! The picture is all blurry and dim!" Downtrodden and crestfallen, the user 2114 wonders if he will ever be in an environment 2119 with Buster 2116 enjoying a spur of the moment barramundi take out dinner like this again.

Advantageously, embodiments of the disclosure provide a solution to this dilemma by alerting the user 2114 when the image capture device cover 2121 is smudged. Turning now to FIG. 1, illustrated therein is one explanatory method 100 demonstrating how this can occur. In one or more embodiments, the method 100 can be implemented by an electronic device 120 comprising a touch sensor, an image sensor, and a motion sensor. In one or more embodiments, these components work in conjunction to determine the cleanliness of the image capture device cover 121 and provide appropriate notifications to the user 2114.

As before, at step 101 our friendly user 2114 is again preparing to take a picture of Buster 2116. However, rather than having to suffer along with the prior art electronic device (2120) of FIG. 21, at step 101 the user 2114 has an electronic device 120 configured in accordance with one or more embodiments of the disclosure.

In one or more embodiments, the electronic device 120 comprises a device housing 116 defining at least one aperture 119, an image capture device 114 situated within the device housing 116 and having a field of view 115 through the at least one aperture 119, and an image capture device cover 121 coupled to the device housing 116 and spanning the at least one aperture 119. In one or more embodiments, a pressure sensor 124 is positioned between the image capture device cover 121 and the device housing. In one or more embodiments, a display 118 defines a user interface for the electronic device 120. One or more processors (shown in FIG. 2 below) are operable with the image capture device 114, the pressure sensor 124, and the user interface.

Once again, the user 2114 is preparing to capture one or more images of his dog, Buster 2116, who is situated within an environment 2119 of the electronic device 120. At step 101, the electronic device 120 is in a preview mode, with a depiction of Buster 2116 being presented on the display 118 of the electronic device 120.

Once again, at step 102 the user accidentally touches the image capture device cover 121 with a dirty finger. This has again left butter 2122 all over the image capture device cover 121, as shown at step 103. However, the pressure sensor 124 detects this touch occurring at step 102. Advantageously, this allows decision 104 to perform a multi-factor assessment to determine whether the image capture device cover 121 is smudged.

In one or more embodiments, decision 104 comprises determining, by the one or more processors of the electronic device 120, that the image capture device cover 121 is smudged using a multi-factor assessment. In one or more embodiments, the at least one factor of the multi-factor assessment comprises a measurement of pressure 105 applied to the image capture device cover 121, as detected by the pressure sensor 124.

Since the multi-factor assessment is a multi-factor assessment, at least one other factor is considered at decision 104. Illustrating by example, in one or more embodiments the at least one other factor of the multi-factor assessment comprises data 106 received from an image sensor of the image capture device 114 situated beneath the image capture device cover 121 within the electronic device 120. In one or more embodiments, these data 106 comprises an absence of at least some high frequency content in one or more images captured by the image capture device 114 when compared to one or more other images previously captured by the image capture device 114.

These data 106 can be considered and processed in different ways. For instance, in one or more embodiments decision 104 comprises comparing at least one modulation transfer function associated with the one or more images captured by the image capture device 114 with at least one other modulation transfer function associated with the one or more other images previously captured by the image capture device 114 to determine whether the absence of the at least some high frequency content appears in the one or more images captured by the image capture device 114. In other embodiments, decision 104 can comprise comparing at least one specific frequency response measurement associated with the one or more images captured by the image capture device 114 with at least one other specific frequency response measurement associated with the one or more other images previously captured by the image capture device 114 to determine whether the absence of the at least some high frequency content appears in the one or more images captured by the image capture device.

In other embodiments, the data 106 received from the image sensor of the image capture device 114 comprises a sharpness score. In one or more embodiments, the one or more processors of the electronic device 120 determine the sharpness score by passing image data associated with the at least one image simultaneously through a high pass filter to obtain filtered image data and a summation function to obtain summed image data. The one or more processors then divide the filtered image data by the summed image data in one or more embodiments.

In still other embodiments, the data 106 received from the image sensor of the image capture device 114 comprises an absence of at least some dark and light tonal content in one or more images captured by the image capture device 114 when compared to one or more other images previously captured by the image capture device 114. Illustrating by example, in one or more embodiments decision 104 comprises comparing at least one histogram associated with the one or more images captured by the image capture device 114 with at least one other histogram associated with the one or more other images previously captured by the image capture device 114 to determine whether the absence of at least some dark and light tonal content appears in one or more images captured by the image capture device 114.

In other embodiments, decision 104 will comprise comparing at least one dynamic range associated with the one or more images captured by the image capture device 114 with at least one other dynamic range associated with the one or more other images previously captured by the image capture device 114 to determine whether the absence of at least some dark and light tonal content appears in one or more images captured by the image capture device 114. In other embodiments, the data 106 received from the image sensor of the image capture device 114 comprises a measurement of flare appearing in one or more images captured by the image capture device 114 when compared to one or more other images previously captured by the image capture device 114. Of course, these examples of data 106 can be used alone or in combination. Other examples of data 106 associated with images captured by the image capture device 114 will be obvious to those of ordinary skill in the art having the benefit of this disclosure.

The multi-factor assessment performed at decision 104 can include other factors as well. For instance, in one or more embodiments at least one other factor of the multi-factor assessment comprises one or more of motion data of the electronic device 120 in three-dimensional space and/or orientation data of the electronic device 120 in the three-dimensional space, which are shown as motion sensor data 107 in FIG. 1.

If the multi-factor assessment performed at decision 104 indicates that the image capture device cover 121 is not smudged, the method 100 moves to step 111 where one or more images can be captured by the image capture device 114. By contrast, when decision 104 determines that the image capture device cover 121 is smudged, in one or more embodiments step 108 comprises causing, by the one or more processors of the electronic device 120, a user interface of the electronic device 120 to present indicia indicating that the image capture device cover 121 is smudged. In one or more embodiments, the indicia indicating that the image capture device cover 121 is smudged comprises a ring circumscribing a user actuation target that, when actuated, causes the image capture device 114 situated beneath the image capture device cover 121 to capture one or more images at step 111.

Decision 109 then determines whether the user 2114 has cleaned the image capture device cover 121. Said differently, in one or more embodiments decision 109 comprises detecting, by the one or more processors of the electronic device 120, whether the image capture device cover 121 has been cleaned. In one or more embodiments, this occurs using another multi-factor assessment comprising another measurement of pressure applied to the image capture device cover 121. When decision 109 determines that the image capture device cover 121 has been cleaned, step 110 comprises altering the indicia presented at step 108 that indicated the image capture device cover 121 was smudged.

However, embodiments of the disclosure contemplate that sometimes a user 2114 may not have time, or may not want, to clean the image capture device cover 121. Accordingly, if decision 109 determines the image capture device cover 121 is still dirty, the method 100 can still move to step 111 where one or more images are captured.

The one or more images are rendered at step 112. In this illustrative embodiment, the user 2114 took the time to clean the image capture device cover 121. Accordingly, at step 113 the user 2114 triumphantly exclaims, "Wow! I'm glad it told me to clean the lens." His shot of Buster 2116, rendered on the electronic device 120, looks amazing.

Thus, as shown and described, FIG. 1 shows a method 100 for notifying a user 2114 of a dirty lens on an image capture device 114 and instructing the user to clean the lens. The method 100 begins with the detection of a dirty lens, followed by a notification to the user 2114, and culminates with the user 2114 cleaning the lens and capturing an image. The method 100 can be implemented by components including a pressure sensor 124, an image sensor, and a motion sensor, which provide inputs to determine if the lens is dirty.

Figure 2:
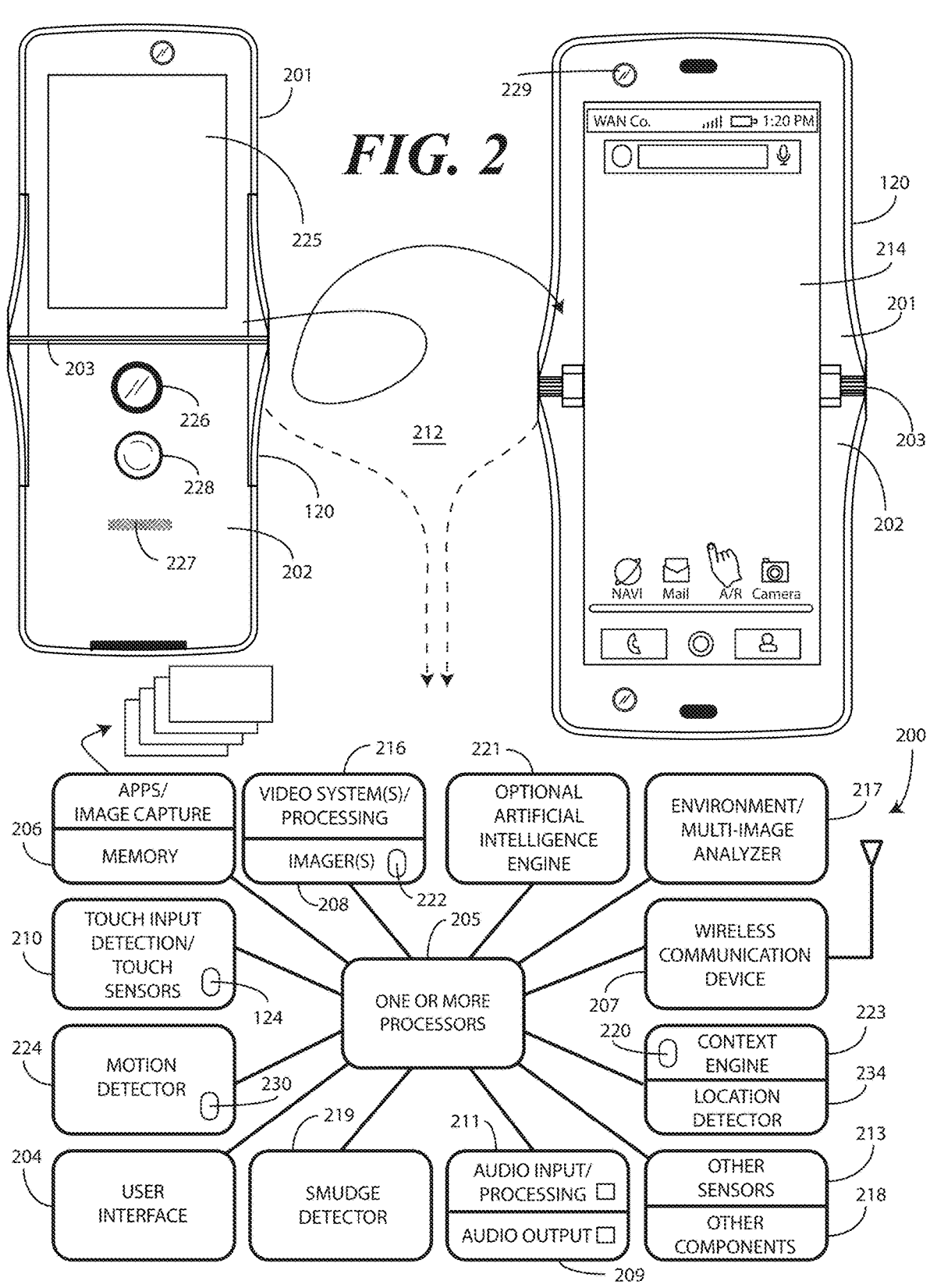
FIG. 2 illustrates one explanatory electronic device in accordance with one or more embodiments of the disclosure.

Turning now to FIG. 2, illustrated therein are more details of one explanatory electronic device 120 configured in accordance with one or more embodiments of the disclosure. While illustrated as a hinged electronic device, the electronic device 120 could include a singular housing that is not deformable and has no hinge, configured in a traditional "candy bar" form factor as well.

Where configured as a candy bar, the display 214 of electronic device 120 would remain exposed and accessible. By contrast, where configured as a hinged device having a first device housing 201 that is selectively pivotable about a hinge 203 relative to the second device housing 202 between a closed position and an axially displaced open position, the display 214 of the electronic device 120 can be selectively concealed and revealed, depending upon whether the electronic device 120 is in the closed position or the axially displaced open position.

The electronic device 120 of FIG. 2 is configured as a portable electronic device, and for illustrative purposes is configured as a smartphone. However, the electronic device 120 could be configured in other ways as well. For example, the electronic device 120 could be configured as a tablet computer, a gaming device, a multimedia player, and so forth. Still other types of electronic devices can be configured in accordance with one or more embodiments of the disclosure as will be readily appreciated by those of ordinary skill in the art having the benefit of this disclosure.

The illustrative electronic device 120 of FIG. 2 includes multiple displays 214,225. A secondary display 225, which can be coupled to either of the first device housing 201 or the second device housing 202, is coupled to the first device housing 201 in this embodiment. This display 225 is considered to be an "exterior" display due to the fact that it is exposed when the first device housing 201 and the second device housing 202 are in the closed position.

The primary display, i.e., display 214, can also be coupled to either or both of the first device housing 201 or the second device housing 202. In this illustrative embodiment, the display 214 is coupled to both the first device housing 201 and the second device housing 202 and spans the hinge 203. In other embodiments, this display 214 can be replaced by two displays, with one coupled to the first device housing 201 and another coupled to the second device housing 202. In either case, this display 214 is considered to be an "interior" display because it is concealed when the first device housing 201 and the second device housing 202 are in the closed position. Either or both of display 214 and/or display 225 can be touch sensitive.

Features can be incorporated into the first device housing 201 and/or the second device housing 202. Examples of such features include an optional camera 226, which is used as the image capture device (114) in the method (100) of FIG. 1, or an optional speaker port 227. Each is shown disposed on the rear side of the electronic device 120 in FIG. 2, but image capture devices could be placed on the front side instead of, or in addition to, camera 226 as well. Illustrating by example, in this illustrative embodiment at least one image capture device 208 is positioned on the front side of the electronic device 120 as well. In this illustrative embodiment, an optional user interface component 228, which may be a button or touch sensitive surface, can also be disposed along the rear side of the second device housing 202.

Also illustrated in FIG. 2 is one explanatory block diagram schematic 200 of one or more components suitable for inclusion the electronic device 120. In one or more embodiments, the block diagram schematic 200 is configured as a printed circuit board assembly disposed within the first device housing 201 and/or second device housing 202 of electronic device 120.

Various components can be electrically coupled together by conductors, or a bus disposed along one or more printed circuit boards. It should be noted that the block diagram schematic 200 includes many components that are optional, but which are included in an effort to demonstrate how varied electronic devices configured in accordance with embodiments of the disclosure can be.

Thus, it is to be understood that the block diagram schematic 200 of FIG. 2 is provided for illustrative purposes only and for illustrating components of one electronic device 120 in accordance with embodiments of the disclosure. The block diagram schematic 200 of FIG. 2 is not intended to be a complete schematic diagram of the various components required for an electronic device 120. Therefore, other electronic devices in accordance with embodiments of the disclosure may include various other components not shown in FIG. 2 or may include a combination of two or more components or a division of a particular component into two or more separate components, and still be within the scope of the present disclosure.

The illustrative block diagram schematic 200 of FIG. 2 includes many different components. Embodiments of the disclosure contemplate that the number and arrangement of such components can change depending on the particular application. Accordingly, electronic devices configured in accordance with embodiments of the disclosure can include some components that are not shown in FIG. 2, and other components that are shown may not be needed and can therefore be omitted.

The illustrative block diagram schematic 200 includes a user interface 204. In one or more embodiments, the user interface 204 includes the display 214, which may optionally be touch sensitive. In one embodiment, users can deliver user input to the display 214 by delivering touch input from a finger, stylus, or other objects disposed proximately with the display 214.

For electronic device 120, since the display 214 spans the hinge 203, it is configured to be flexible. For instance, in one embodiment this display 214 is configured as an organic light emitting diode (OLED) display fabricated on a flexible plastic substrate. This allows the display 214 to be flexible so as to deform when the first device housing 201 pivots about the hinge 203 relative to the second device housing 202. However, it should be noted that other types of displays would be obvious to those of ordinary skill in the art having the benefit of this disclosure. In other embodiments conventional, rigid displays can be disposed to either side of the hinge 203 rather than using a flexible display.

In one embodiment, the display 214 is configured as an active-matrix organic light emitting diode (AMOLED) display. However, it should be noted that other types of displays, including liquid crystal displays, would be obvious to those of ordinary skill in the art having the benefit of this disclosure.

In one embodiment, the electronic device 120 includes one or more processors 205. In one embodiment, the one or more processors 205 can include an application processor and, optionally, one or more auxiliary processors. One or both of the application processor or the auxiliary processor(s) can include one or more processors. One or both of the application processor or the auxiliary processor(s) can be a microprocessor, a group of processing components, one or more ASICs, programmable logic, or other type of processing device.

The application processor and the auxiliary processor(s) can be operable with the various components of the block diagram schematic 200. Each of the application processor and the auxiliary processor(s) can be configured to process and execute executable software code to perform the various functions of the electronic device 120 with which the block diagram schematic 200 operates. A storage device, such as memory 206, can optionally store the executable software code used by the one or more processors 205 during operation.

In this illustrative embodiment, the block diagram schematic 200 also includes a communication device 207 that can be configured for wired or wireless communication with one or more other devices or networks. The networks can include a wide area network, a local area network, and/or personal area network. The communication device 207 may also utilize wireless technology for communication, such as, but are not limited to, peer-to-peer or ad hoc communications such as HomeRF, Bluetooth and IEEE 802.11, and other forms of wireless communication such as infrared technology. The communication device 207 can include wireless communication circuitry, one of a receiver, a transmitter, or transceiver, and one or more antennas.

In one embodiment, the one or more processors 205 can be responsible for performing the primary functions of the electronic device with which the block diagram schematic 200 is operational. For example, in one embodiment the one or more processors 205 comprise one or more circuits operable with the user interface 204 to present presentation information to a user. This information can include images and/or video captured by one or more image capture devices 208 of the electronic device 120. Additionally, the one or more processors 205 can be operable with an audio output device 209 to deliver audio output to a user. The executable software code used by the one or more processors 205 can be configured as one or more modules that are operable with the one or more processors 205. Such modules can store instructions, control algorithms, and so forth.

In one or more embodiments, the block diagram schematic 200 includes an audio input/processor 211. The audio input/processor 211 can include hardware, executable code, and speech monitor executable code in one embodiment. The audio input/processor 211 can include, stored in memory 206, basic speech models, trained speech models, or other modules that are used by the audio input/processor 211 to receive and identify voice commands that are received with audio input captured by an audio input device. In one embodiment, the audio input/processor 211 can include a voice recognition engine. Regardless of the specific implementation utilized in the various embodiments, the audio input/processor 211 can access various speech models to identify speech commands in one or more embodiments.

The audio input/processor 211 is operable as an audio capture device to receive and capture audio input from a source, such as a person, authorized user, plurality of persons within an environment 212 about the electronic device 120. The audio input/processor 211 can include hardware, executable code, and speech monitor executable code in one embodiment. The audio input/processor 211 can be operable with one or more predefined authentication references stored in memory 206. In one or more embodiments, the audio input/processor 211 can receive and identify voice commands that are received with audio input captured by an audio input device. In one embodiment, the audio input/ processor 211 can include a voice recognition engine. Regardless of the specific implementation utilized in the various embodiments, the audio input/processor 211 can access various speech models stored with the predefined authentication references to identify speech commands.

In one embodiment, the audio input/processor 211 is configured to implement a voice control feature that allows the electronic device 120 to function as a voice assistant device, which may be configured as a voice assistant engine. In one or more embodiments, the voice assistant engine is a digital assistant using voice recognition, speech synthesis, and natural language processing to receive audio input comprising a voice command from a source, determine the appropriate response to the voice command, and then deliver the response in the form of audio output in response to receiving the audio input from the source. When so configured, a user can cause the emanation of the audio input from their mouth to cause the one or more processors 205 of the electronic device 120 to execute a control operation.

Various sensors 213 can be operable with the one or more processors 205. A first example of a sensor that can be included with the various sensors 213 is a touch sensors 210.

The electronic device 120 can include one or more touch sensors, each of which can include a capacitive touch sensor, an infrared touch sensor, resistive touch sensors, or another touch-sensitive technology.

Another example of a sensor 213 is a geo-locator that serves as a location detector 234. In one embodiment, location detector 234 determines location data of the electronic device 120. Location can be determined by capturing the location data from a constellation of one or more earth orbiting satellites, or from a network of terrestrial base stations to determine an approximate location. The location detector 234 may also be able to determine location by locating or triangulating terrestrial base stations of a traditional cellular network, such as a CDMA network or GSM network, or from other local area networks, such as Wi-Fi networks.

Another example of a sensor 213 suitable for inclusion with the electronic device 120 include one or more motion sensors 224 that are operable to determine an orientation and/or movement of the electronic device 120 in three-dimensional space. Illustrating by example, the one or more motion sensors 224 can include an accelerometer, gyroscopes, inertial measurement units, or other device to detect device orientation and/or motion of the electronic device 120.

Another example of a sensor 213 is a force sensor. Where included, the force sensor can take various forms. For example, in one embodiment, the force sensor comprises resistive switches or a force switch array configured to detect contact with either the display or the housing of an electronic device. In another embodiment, the force sensor can be capacitive. In yet another embodiment, piezoelectric sensors can be configured to sense force as well.

A image processing system 216 can be included in the electronic device 120 and can be operable with the one or more processors 205. The image processing system 216 can be operable with one or more image capture devices 208 and can process one or more video frames with a first video stabilization operation or second video stabilization operation in response to a detected touch input as previously described. The one or more image capture devices 208 suitable for capturing video frames can comprise one or more of a conventional image capture device, such as a camera 226, a depth image capture device, and, optionally, one or more proximity sensors.

In one embodiment, the one or more image capture devices 208 comprise a two-dimensional image capture device, such as that illustrated by camera 226. In one or more embodiments, the camera 226 comprises a two-dimensional Red-Green-Blue (RGB) image capture device. The one or more image capture devices 208 can also include an infrared image capture device. Other types of image capture devices suitable for inclusion with the one or more image capture devices 208 will be obvious to those of ordinary skill in the art having the benefit of this disclosure.

In one or more embodiments, the image processing system 216 can be operable with an environmental analyzer 217. The environmental analyzer 217 can be configured to process a video or depth scan of an object and determine whether the object matches predetermined criteria by comparing the image or depth scan to one or more predefined authentication references stored in memory 206. Working in conjunction with the environmental analyzer 217, in one or more embodiments the image processing system 216 can be configured to identify non-standard lighting conditions, including low-light conditions or unbalanced ambient light levels such as may occur when sun is shining through a window into a dark room. Beneficially, this optical recognition performed by the image processing system 216 operating in conjunction with the environmental analyzer 217 allows the amount of cropping that occurs when either using a single-handed touch input or multi-handed touch input video stabilization process to be increased or decreased as a function of the amount of light being captured in the video frames.

Other components 218 operable with the one or more processors 205 can include output components such as video, audio, and/or mechanical outputs. For example, the output components may include a video output component or auxiliary devices including a cathode ray tube, liquid crystal display, plasma display, incandescent light, fluorescent light, front or rear projection display, and light emitting diode indicator. Other examples of output components include audio output components such as the one or more loudspeakers, the ultrasound transducers (where included), or other alarms and/or buzzers. The other components 218 can also include a mechanical output component such as vibrating or motion-based mechanisms.

The other components 218 can optionally include a barometer operable to sense changes in air pressure due to elevation changes or differing pressures of the electronic device 120. The other components 218 can also optionally include a light sensor that detects changes in optical intensity, color, light, or shadow. In one or more embodiments, the light sensor is operable to determine whether the environment 212 of the electronic device 120 is a low-light environment.

In one or more embodiments, the one or more processors 205 can define one or more process engines. Examples of these process engines include a smudge detector 219, an artificial intelligence engine 321, an image data store 222, and a context engine 223. Each engine can be a component of the one or more processors 205, operable with the one or more processors 205, defined by the one or more processors 205, and/or integrated into the one or more processors 205. Other configurations for these engines, including as software or firmware modules operable on the one or more processors 205, will be obvious to those of ordinary skill in the art having the benefit of this disclosure.

For instance, a context engine 223 can be operable with the various sensors to detect, infer, capture, and otherwise detect external conditions occurring within the environment 212 of the electronic device 120. For example, where included one embodiment of the context engine 223 determines assessed contexts and frameworks using adjustable algorithms of context assessment employing information, data, and events. These assessments may be learned through repetitive data analysis. Alternatively, a user may employ the user interface 204 to enter various parameters, constructs, rules, and/or paradigms that instruct or otherwise guide the context engine 223 in detecting, for example, when the electronic device 120 is being supported by a multi-handed touch input or a single-handed touch input and other contextual information. The context engine 223 can comprise an artificial neural network or other similar technology in one or more embodiments.

The smudge detector 219 can determine, from signals from both the image capture device 208 and the touch sensors 210, which includes a pressure sensor 124 situated between the image capture device cover (121) and a device housing as previously described, whether the image capture device cover (121) is smudged using a multi-factor assessment. In one or more embodiments, when the multi-factor assessment indicates that the image capture device cover (121) is smudged, the smudge detector 219 can cause the user interface 204 of the electronic device to present indicia indicating that the image capture device cover is smudged.

In one or more embodiments, the smudge detector 219 also uses signals from the one or more motion and orientation detectors as well. Illustrating by example, in one or more embodiments the smudge detector 219 determines, from other signals from the one or more motion and orientation detectors, whether the image capture device cover (121) is smudged using the multi-factor assessment. As noted above, the one or more motion and orientation detectors can include one or more inertial measurement units 230. The one or more inertial measurement units 230 can be carried by the first device housing 201, the second device housing 202, or combinations thereof. Examples of how the multi-factor assessment works will be illustrated and described below with reference to subsequent figures.

The image data store 222 can be configured to store both more recent image data from more recent images captured by the image capture device 208 and less recent image data from less recent images captured by the image capture device. Since embodiments of the disclosure contemplate that it can be difficult to determine whether an image capture device cover (121) is smudged with a single image frame, in one or more embodiments the smudge detector 219 compares the more recent image data stored in the image data store 222 with the less recent image data stored in the image data store to determine whether the image capture device cover (121) is smudged. In one or more embodiments, the image data store 222 stores a rolling average of more recent image data from the more recent images. By contrast, the less recent image data form less recent images can, in some embodiments, be stored in the factory when the electronic device 120 is assembled, as this is when the image capture device cover (121) will be most clean.

In one or more embodiments, each of the smudge detector 219, the artificial intelligence engine 321, the image data store 222, and the context engine 223 is operable with the one or more processors 205. In some embodiments, the one or more processors 205 can control the smudge detector 219, the artificial intelligence engine 321, the image data store 222, and the context engine 223. In other embodiments, each of the smudge detector 219, the artificial intelligence engine 321, the image data store 222, and the context engine 223 can operate independently, delivering information to the one or more processors 205. The smudge detector 219, the artificial intelligence engine 321, the image data store 222, and the context engine 223 can each receive data from the various sensors 213. In one or more embodiments, the one or more processors 205 are configured to perform the operations of the smudge detector 219, the artificial intelligence engine 321, the image data store 222, and the context engine 223.

When executing operations such as those method steps described above with reference to FIG. 1, in one or more embodiments the smudge detector 219 determines, from the one or more sensors 213, that an image capture device cover (121) is smudged using a multi-factor assessment. Where the multi-factor assessment indicates the image capture device cover (121) is smudged, the smudge detector 219 can cause the user interface 204 of the electronic device 120 to present indicia indicating that the image capture device cover is smudged.

In one or more embodiments, the smudge detector 219 can also determine, using another multi-factor assessment, whether the image capture device cover (121) has been cleaned. Said differently, in one or more embodiments the smudge detector 219 performs an image capture device cover cleaning operation confirmation process using another multi-factor assessment of data received from the image capture device 208 having a field of view through the image capture device cover (121). When the image capture device cover operation confirmation process fails to confirm the cleaning operation has occurred, the smudge detector can again present the indicia indicating that the image capture device cover is smudged. By contrast, when the smudge detector 219 determines, using the one or more sensors 213, that a cleaning operation has occurred at the image capture device cover (121). In one or more embodiments, in response to the cleaning operation, the smudge detector 219 alters the indicia indicating that the image capture device cover is smudged.

Accordingly, as shown in FIG. 2, block diagram schematic 200 serves as a foundational representation of the electronic device 120, illustrating the interconnectivity and arrangement of various components within the electronic device 120. Block diagram schematic 200 provides a visual framework for understanding the functional relationships between the components and their collective role in the operation of the electronic device 120.

First device housing 201 and second device housing 202 together form the protective enclosure for the electronic device 120. These housings define the physical boundaries of the device and protect the internal components from environmental factors and user-induced wear and tear. Hinge 203 connects first device housing 201 and second device housing 202, allowing for the articulation of the electronic device 120, which may be a feature in foldable or flip-style devices.

User interface 204 serves as the primary means by which the user interacts with the electronic device 120. This interface comprises visual displays, touchscreens, buttons, and other input mechanisms. The central processing units of the electronic device 120, referred to as one or more processors 205, execute instructions and control the operation of the device in conjunction with applications stored in the memory 206.

Communication device 207 enables the electronic device 120 to connect and communicate with other devices, networks, or systems. This component may include cellular, Wi-Fi, Bluetooth, NFC, or other communication modules. Image capture devices 208 are the cameras or sensors that allow the electronic device 120 to capture images and videos.

Audio output 209 and audio input/processor 211 are responsible for sound output and input, respectively. Audio output 209 may include speakers or other sound-emitting components, while audio input/processor 211 may include microphones and associated processing hardware for capturing and processing audio signals.

Touch sensors 210 are integrated into the electronic device 120 to detect touch inputs from the user. These sensors can be part of the display or separate components that register touch interactions. Smudge detector 219 is a component that works in conjunction with the image capture devices 208 and other sensors to detect the presence of smudges on the image capture device cover (121).

Image processing system 216 processes the images captured by the image capture devices 208, performing tasks such as image enhancement, compression, and analysis. environment/multi-image analyzer 217 analyzes multiple images or environmental data to assess conditions such as lighting, motion, and the presence of smudges.

Other sensors 213 may include a variety of sensors such as gyroscopes, accelerometers, proximity sensors, and ambient light sensors, which provide additional data about the device's environment and usage. Other components 218 may include additional hardware such as batteries, storage devices, and input/output interfaces that support the functionality of the electronic device 120.

The neural network 220 of the context engine 223 can be configured as a machine learning component that may be used for advanced image processing, pattern recognition, and decision-making processes within the electronic device 120. Location detector 234 can use GPS or other location-determining technologies to ascertain the geographic position of the electronic device 120.

The optional artificial intelligence engine 221 may be employed to enhance the capabilities of the electronic device 120 by enabling intelligent features such as predictive text, voice recognition, and automated decision-making. Image capture device 208 is an additional camera or sensor that provides alternative perspectives or specialized imaging capabilities.

Exterior display 225 is an additional screen on the electronic device 120 that may provide notifications, auxiliary information, or secondary user interface options. Image capture device is another camera 226 or sensor that may be oriented differently from image capture device 208 to offer varied imaging functions.

Speaker port 227 allows sound from audio output 209 to be transmitted to the user. User interface control device 228 is a component that manages the various input and output mechanisms of user interface 204, ensuring a seamless user experience.

Context engine 223 interprets data from other sensors 213 and other components 218 to provide contextual awareness for the electronic device 120, enhancing the device's responsiveness to user needs and environmental conditions. Motion sensor 224 detects movement of the electronic device 120 and may be used in conjunction with the smudge detector 219 to determine if the image capture device cover is smudged.

Rear facing image capture device 229 is positioned on the opposite side of the electronic device 120 from the user when the device is in use, typically used for capturing images or videos of the environment rather than the user.

The electronic device 120 comprises a device housing defining at least one aperture, an image capture device situated within the device housing and having a field of view through the at least one aperture, an image capture device cover coupled to the device housing and spanning the at least one aperture, a pressure sensor positioned between the image capture device cover and the device housing, a user interface, and one or more processors operable with the image capture device, the pressure sensor, and the user interface. The one or more processors determine, from signals from both the image capture device and the pressure sensor, whether the image capture device cover is smudged using a multi-factor assessment, and when the multi-factor assessment indicates that the image capture device cover is smudged, cause the user interface of the electronic device to present indicia indicating that the image capture device cover is smudged.

The electronic device further comprises one or more motion and orientation detectors, wherein the one or more processors further determine, from other signals from the one or more motion and orientation detectors, whether the image capture device cover is smudged using the multi-factor assessment. The one or more motion and orientation detectors comprise one or more inertial measurement units carried by the device housing.

Now that the general method (100) and components of the electronic device 120 have been illustrated and described, attention will be turned to systems for determining whether an image capture device cover is smudged, with those systems being suitable for incorporation into a portable electronic device such as the electronic device 120 of FIGS. 1-2. Turning now to FIG. 3, illustrated therein is one such system 300.

In one or more embodiments, the system 300 combines hardware components and software analysis to (1) detect whether an image capture device cover is dirty or potentially dirty, (2) optionally detect whether a user has cleaned the image capture device cover, and (3) notify the user when the image capture device cover is dirty or potentially dirty in a non-intrusive and friendly manner. In one or more embodiments, the system 300 uses a touch sensor 301 to determine whether the image capture device cover has been touched, data 302 received form an image sensor of an image capture device situated beneath the image capture device cover, and one or more motion and orientation detectors 303, examples of which include inertial measurement units, as inputs for a decision algorithm 304. In one or more embodiments, the decision algorithm calculates a sharpness score and outputs indicia indicating that the image capture device cover is smudged 305 when a multi-factor assessment using these inputs indicates the image capture device cover is dirty.

Illustrating by example, turning now to FIG. 4, in one or more embodiments the touch sensor 301 comprises a pressure sensor 406 that is situated between a device housing and an image capture device cover 401 of an electronic device 400 that defines at least one lens 402 for the image capture devices. In the illustrative embodiment of FIG. 4, the camera assembly includes three image capture devices. A first image capture device 403 is situated within the device housing 407 and has a first field of view through a first aperture in the device housing 407, while a second image capture device 404 and third image capture device 405 are also situated within the device housing 407 and have fields of view through a second aperture and third aperture, respectively. In this illustrative embodiment, the image capture device cover 401 spans each aperture and covers each image capture device.

In this illustrative embodiment, the pressure sensor 406 is situated between the image capture device cover 401 and the device housing 407, and more particularly between the second image capture device 404 and the third image capture device 405. When a user touches the image capture device cover 401, the pressure sensor 406 detects the movement of the image capture device cover 401, such as when it flexes atop the apertures through which the first image capture device 403, the second image capture device 404, and the third image capture device 405 have their fields of view. It should be noted that this location for the pressure sensor 406 is one suitable location. However, others will be obvious to those of ordinary skill in the art having the benefit of this disclosure.

In one or more embodiments, the pressure sensor 406 plays an integral role in detecting the cleanliness of the image capture device cover 401, which in this illustrative embodiment defines three lenses atop the image capture devices. In one or more embodiments, the pressure sensor 406 can be integrated into the mobile device, illustratively positioned between two lenses in FIG. 4. This strategic placement allows the pressure sensor 406 to detect any pressure or touch applied to the lenses or the overall image capture device cover 401. By measuring the pressure exerted on the image capture device cover 401, the pressure sensor 406 can determine if a lens defined by the image capture device cover 401 is dirty or potentially dirty.

To ensure optimal functionality, in one or more embodiments the touch sensor has specific design requirements. In one or more embodiments, it is thin, with a thickness of less than 0.3 millimeters, to avoid adding any significant height to the camera assembly of the electronic device 400. While situated between lenses in FIG. 4, in FIG. 5 another pressure sensor 504 is designed to situate beneath the rim 501 of the image capture device cover 502 and the device housing 507 above the image capture device sensor 503. If positioned in another location, the touch sensor 301 should still be sensitive enough to detect minor lens touches from a short distance away.

One important consideration is that in many embodiments the touch sensor 301 cannot rely solely on capacitive sensing technology, as lens touching or cleaning may not always involve bare skin. Therefore, an alternative resistive pressure sensor is recommended. An example of such a pressure sensor 406 is shown in FIG. 4. In one or more embodiments, this pressure sensor 406 has a thickness of 0.15 millimeters and the ability to sense pressures ranging from 0-200 grams of force.

In one or more embodiments, the pressure detected by the pressure sensor 406 is calculated based on the force applied to the image capture device cover 401 during contamination or during cleaning. Embodiments of the disclosure contemplate that when the pressure sensor 406 is situated as shown in FIG. 4, the pressure sensor 406 will typically see around 1.2 pounds per square inch when the image capture device cover 401 is touched, which is well within the dynamic range of common pressure sensors. By comparing this pressure to the dynamic range of the pressure sensor 406, one or more processors of the electronic device 400 can determine whether the image capture device cover 401 has been touched, either to dirty the lenses or clean them. In summary, the touch sensor 301 is an integral component of the system (300) of FIG. 3 and is designed to detect pressure and touch on the image capture device cover 401 of a camera system. Its placement and sensitivity ensure accurate detection of lens cleanliness, contributing to the overall functionality of the dirty lens detection and notification system.

Figure 6:
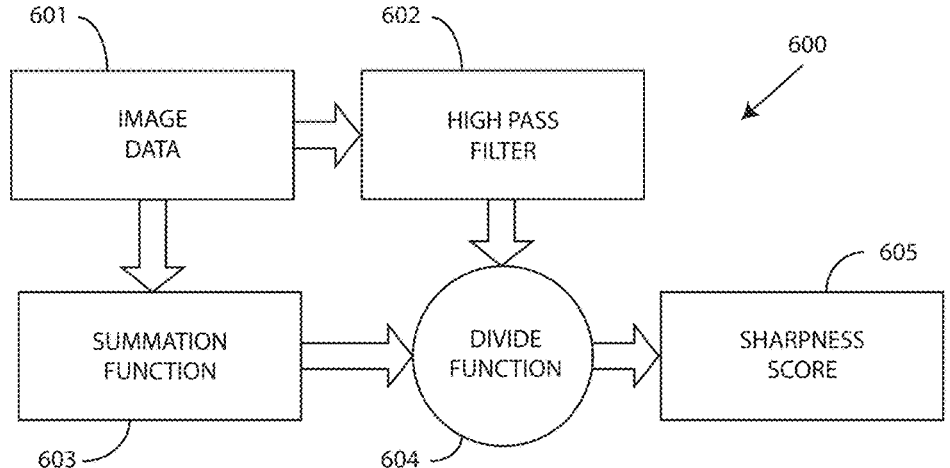
FIG. 6 illustrates another explanatory system in accordance with one or more embodiments of the disclosure.

Turning now back to FIG. 3, in one or more embodiments at least one other factor considered in the multi-factor assessment performed by the decision algorithm 304 comprises data 302 received from an image sensor of an image capture device situated beneath the image capture device cover of the electronic device. In one or more embodiments, these data 302 comprise a sharpness score. Turning now to FIG. 6, illustrated therein is one explanatory analysis system 600 illustrating how such a sharpness score 605 can be calculated.

Figures 7, 8:
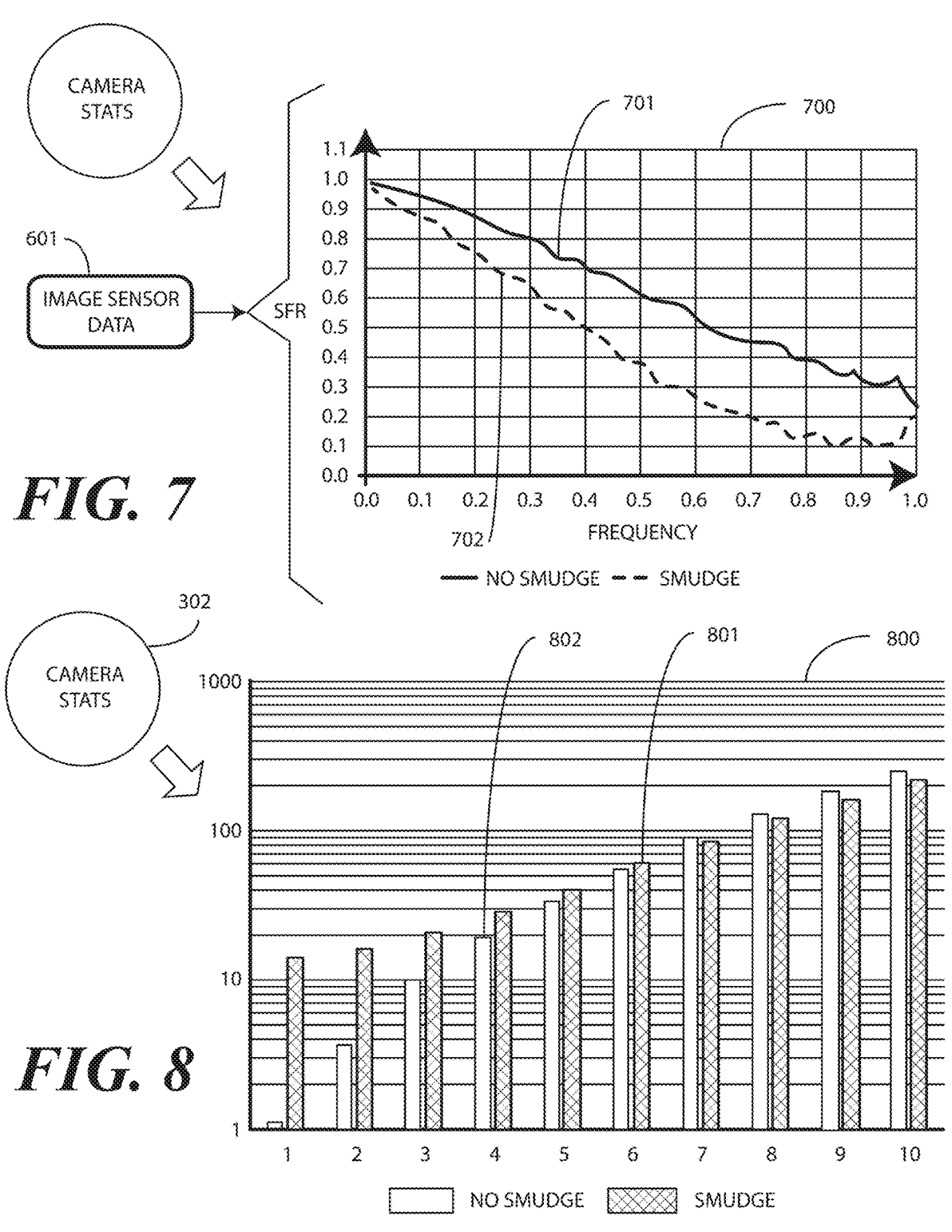
FIG. 7 illustrates explanatory image capture device statistics that can be used in systems configured in accordance with one or more embodiments of the disclosure.
FIG. 8 illustrates additional explanatory image capture device statistics that can be used in systems configured in accordance with one or more embodiments of the disclosure.

The analysis system 600 of FIG. 6 looks for high frequency content to determine whether an image capture device cover may be dirty. Turning briefly to FIG. 7, a graph 700 is shown therein with experimental data of a specific frequency response of image sensor data 601 for an image 701 taken through a non-smudged image capture device cover and another image 702 taken through a smudged image capture device cover. As shown, if there is a smudge on the image capture device cover, this not only makes the image blurry, but reduces the high frequency content of the overall image.

Turning now back to FIG. 6, this image sensor data 601 can be delivered to both a high pass filter 602 and a summation function 603, the outputs of which are delivered to a divide function 604 to calculate the sharpness score. Said differently, in one or more embodiments the sharpness score 605 is calculated by passing image sensor data 601 associated with at least one image simultaneously through a high pass filter 602 to obtain filtered image data and a summation function 603 to obtain summed image data. The filtered image data is then divided by the summed image data to obtain the sharpness score.

Accordingly, when using the analysis system 600 of FIG. 6 as an input in a multi-factor assessment, in one or more embodiments a method in an electronic device comprises determining, by one or more processors, that an image capture device cover is smudged using a multi-factor assessment, wherein at least one factor of the multi-factor assessment comprises a measurement of pressure applied to the image capture device cover. When the multi-factor assessment indicates that the image capture device cover is smudged, the method involves causing, by the one or more processors, a user interface of the electronic device to present indicia indicating that the image capture device cover is smudged.

In one or more embodiments, the analysis system 600 of FIG. 6 determines an absence of at least some high frequency content in one or more images captured by the image capture device when compared to one or more other images previously captured by the image capture device. In one or more embodiments, the analysis system 600 compares at least one modulation transfer function associated with the one or more images captured by the image capture device with at least one other modulation transfer function associated with the one or more other images previously captured by the image capture device to determine whether the absence of the at least some high frequency content appears in the one or more images captured by the image capture device.

In one or more embodiments, a touch sensor (301) is designed to measure pressure applied to the image capture device cover, which is a factor in determining if the cover is smudged. This is one factor of the multi-factor assessment.

When at least one other factor is the analysis system 600 of FIG. 6, data is received from an image sensor of an image capture device situated beneath the image capture device cover within the electronic device. These data include an absence of at least some high frequency content in one or more images captured by the image capture device when compared to one or more other images previously captured by the image capture device. The analysis system 600 passes image data associated with the at least one image simultaneously through a high pass filter to obtain filtered image data and a summation function to obtain summed image data and dividing the filtered image data by the summed image data to produce a sharpness score.

In other embodiments, dynamic range can be used a factor in the multi-factor assessment that determines whether an image capture device cover is dirty or smudged. Illustrating by example, in one or more embodiments the determination can compare at least one dynamic range associated with the one or more images captured by the image capture device with at least one other dynamic range associated with the one or more other images previously captured by the image capture device to determine whether the absence of at least some dark and light tonal content appears in one or more images captured by the image capture device.

Turning now to FIG. 8, illustrated therein is a graph 800 illustrating the dynamic range of an image 802 without any dirt or smudging and another image 801 that was captured through an image capture device cover that was dirty or smudged. As shown, if there is a smudge on the image capture device cover, the captured image will have less dynamic range. This means the "black" will not appear as black, and the "white" will not be as white as shown in the graph 800.

Figure 10:
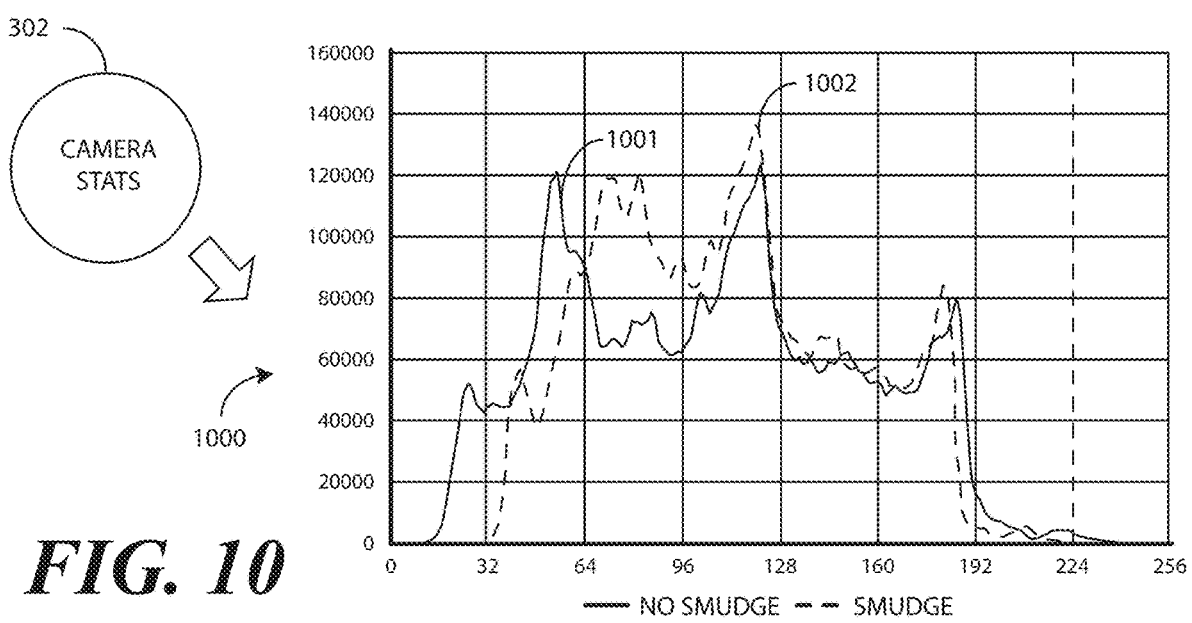
FIG. 10 illustrates even more explanatory image capture device statistics that can be used in systems configured in accordance with one or more embodiments of the disclosure.

The histograms 1001,1002 shown in the graph 1000 of FIG. 10, which are generated over time, illustrate that less black and less white occur when images are captured through a dirty image capture device cover as well. Accordingly, in one or more embodiments dynamic range, be it determined as shown in FIG. 8 or in FIG. 10, is used as a factor in the multi-factor assessment along with a measurement of pressure to determine if an image capture device cover is dirty or smudged. Said differently, in one or more embodiments the data used in a multi-factor assessment comprise an absence of at least some dark and light tonal content in one or more images captured by the image capture device when compared to one or more other images previously captured by the image capture device.

Figure 9:
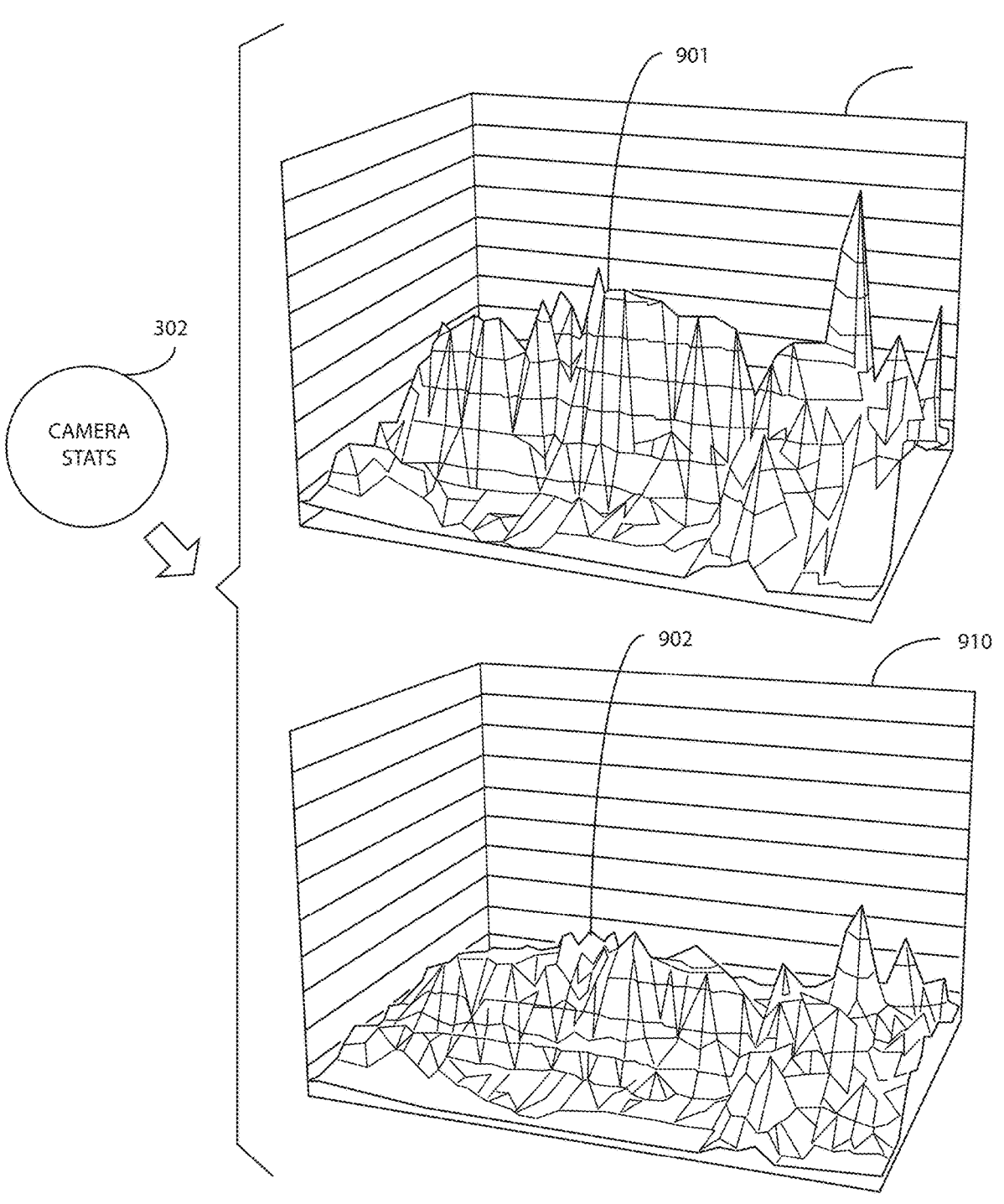
FIG. 9 illustrates still more explanatory image capture device statistics that can be used in systems configured in accordance with one or more embodiments of the disclosure.

Similarly, in still other embodiments, a focal score can be used as a factor in the multi-factor assessment that determines whether an image capture device cover is dirty or smudged. Turning now to FIG. 9, illustrated therein are two histograms 900,910 of an image 901 captured through an image capture device cover that is clean and another image 902 that was captured through a dirty image capture device cover. As can be seen from these histograms 900,910, the focal score represented by the image captured through the dirty image capture device cover is lower. Accordingly, in one or more embodiments the focal score is used as a factor in the multi-factor assessment along with a measurement of pressure to determine if an image capture device cover is dirty or smudged.

Figure 11:
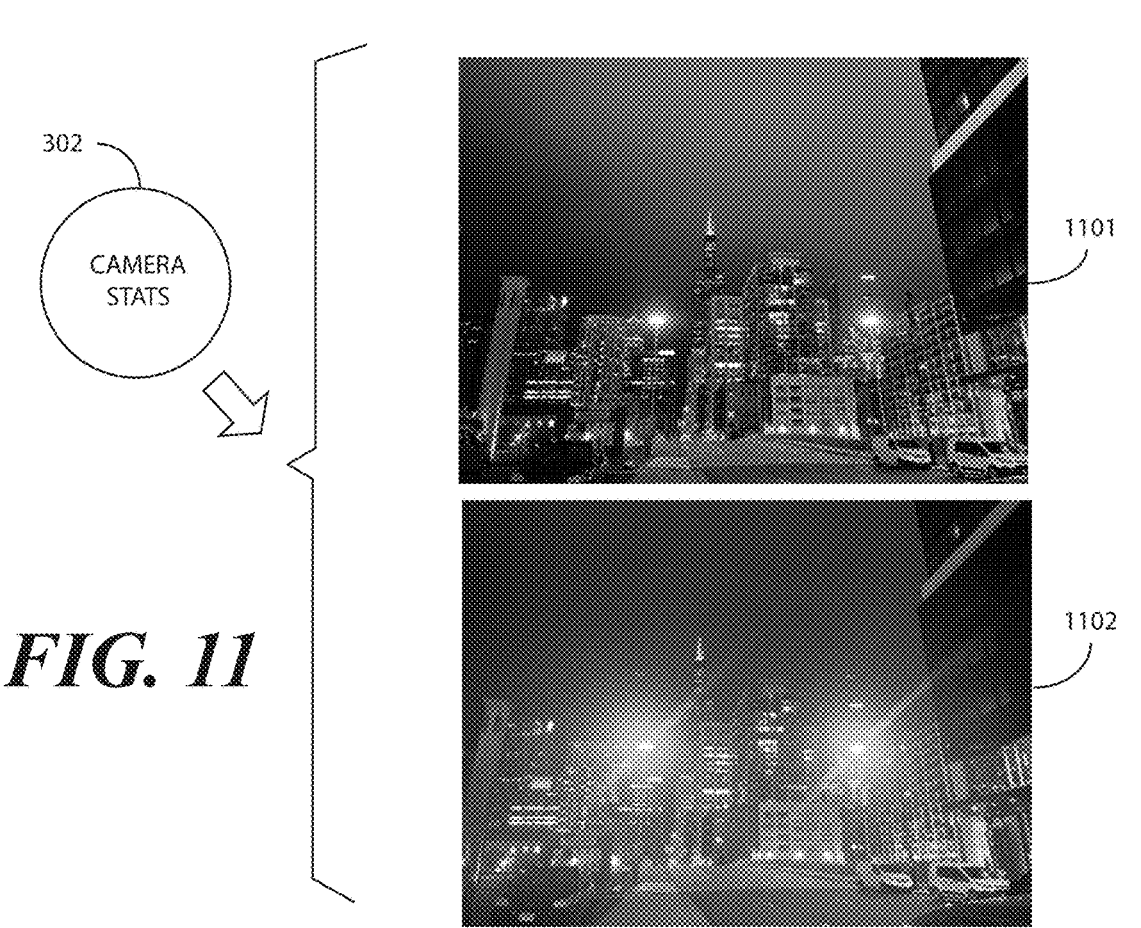
FIG. 11 illustrates more explanatory image capture device statistics that can be used in systems configured in accordance with one or more embodiments of the disclosure.

In still other embodiments, another factor of the multi-factor assessment can comprise a measurement of flare appearing in one or more images compared to one or more other images previously captured by the image capture device. Illustrating by example, turning now to FIG. 11, illustrated therein is a picture 1101 taken through a clean image capture device cover and another picture 1102 taken through a dirty image capture device cover. As can be seen in FIG. 11, there is much more flare in picture 1102. Accordingly, in one or more embodiments the measurement of flare is used as a factor in the multi-factor assessment along with a measurement of pressure to determine if an image capture device cover is dirty or smudged.

Figure 12:
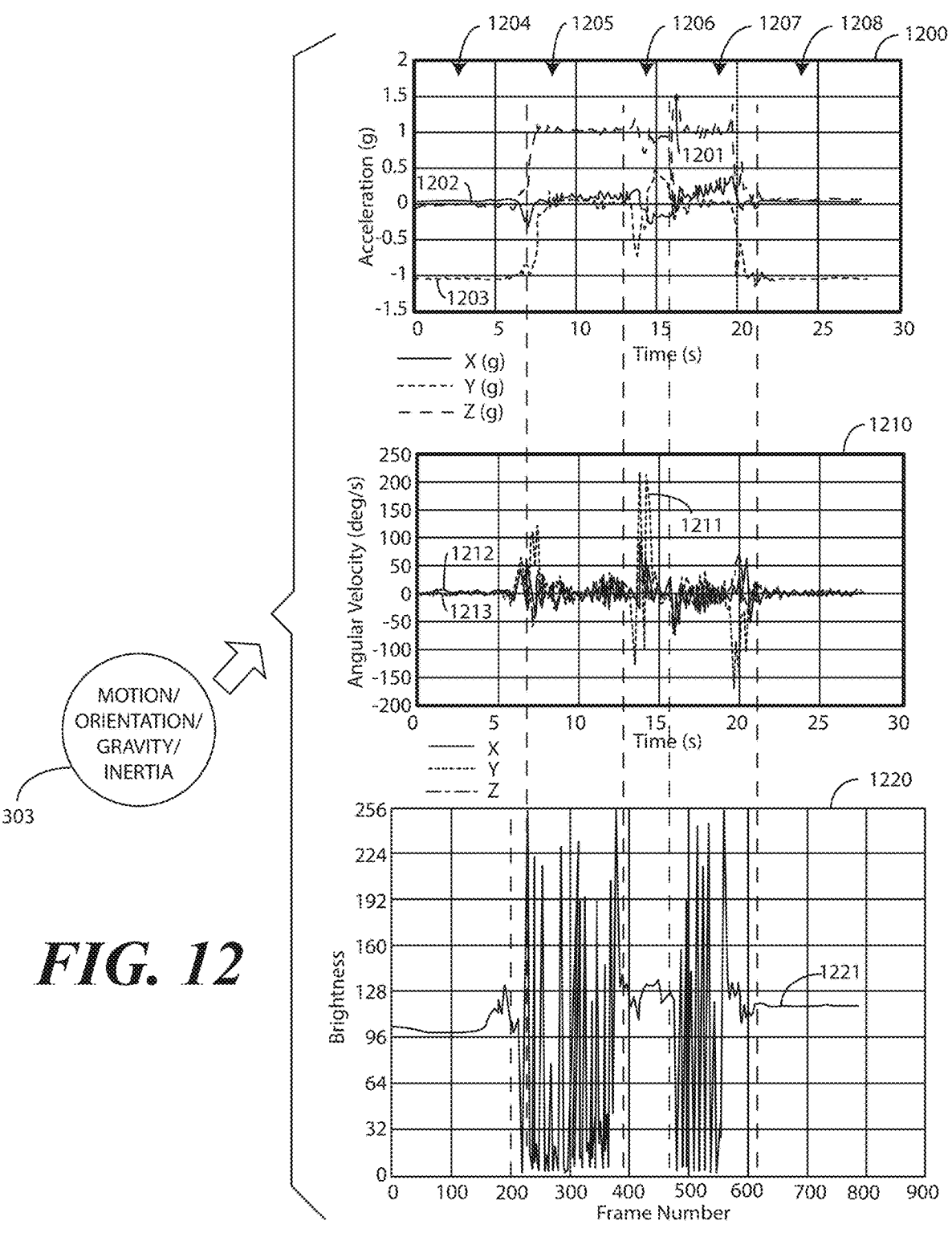
FIG. 12 illustrates explanatory motion data that can be used in systems configured in accordance with one or more embodiments of the disclosure.

Turning now to FIG. 12, when one or more motion and orientation detectors 303 are included with an electronic device, one example of which would be an inertial measurement unit, the multi-factor assessment can use signals from the one or more motion and orientation detectors 303 to determine whether an image capture device cover is smudged. FIG. 12 illustrates explanatory motion data that can be used in systems configured in accordance with one or more embodiments of the disclosure.

Illustrated in FIG. 12 are three graphs 1200,1210, 1220. The first graph 1200 illustrates the X-dimension acceleration 1201, Y-dimension acceleration 1202, and Z-dimension acceleration 1203 experienced by the electronic device in each respective dimension during five distinct scenarios 1204, 1205,1206, 1207,1208. Scenario 1204 is when a user is framing a photo and realizes that the image capture device cover needs to be cleaned. Scenario 1205 is when the user lowers the electronic device to clean the image capture device cover using their shirt. Scenario 1206 is when the user raises the electronic device again to frame the photo, but again notices the image capture device cover is a bit dirty. In scenario 1207, the user cleans the lens again. In scenario 1208, the user frames the photo a third time and captures the image. As shown in these three graphs, the corresponding measurements can indicate changes in the device's position or movement.

In graph 1210, shown is the X-dimension angular velocity 1211, Y-dimension angular velocity 1212, and Z-dimension angular velocity 1213 represent the rotational speed of the electronic device around each respective axis. These measurements can indicate changes in the device's orientation or rotation. In graph 1220, brightness levels 1221 are shown during the five scenarios 1204,1205, 1206, 1207,1208. This data, with different scenarios 1204,1205, 1206, 1207, 1208 showing markedly different angular velocities, accelerations, and brightness levels, can be used in the multi-factor assessment to determine that a cleaning operation has occurred. Accordingly, the data shown in FIG. 12 can be used when one or more processors of an electronic device preform an image capture device cover cleaning operation confirmation process.

The motion data captured by the one or more motion and orientation detectors 303 is valuable in determining the user's interaction with the device and can be used in combination with other factors, such as camera stats and touch sensor data, to assess the cleanliness of the image capture device cover. By analyzing the motion data, the one or more processors can detect patterns or movements that may indicate the need for lens cleaning or the presence of a smudged cover.

It should be noted that the factors illustrated and described above with reference to FIGS. 3-12 can be used alone or in combination to determine if a lens or image capture device cover is smudged or dirty. These factors, including the touch sensor, camera stats, and motion data, provide valuable information that can be analyzed by the one or more processors to assess the cleanliness of the image capture device cover. By considering multiple factors, the system can achieve a more accurate and reliable determination of whether the lens or image capture device cover is smudged or not.

In addition to the factors mentioned, there may be other factors that can be used to determine if a lens is smudged. These factors will be obvious to those of ordinary skill in the art having the benefit of the disclosure. Some potential additional factors include:

Light Intensity: By analyzing the intensity of light captured by the image sensor, variations in brightness or contrast can indicate the presence of a smudge on the lens. A decrease in light intensity may suggest a smudged cover.

Color Distortion: Changes in color accuracy or distortion in the captured images can be indicative of a smudged lens. Analyzing color profiles and comparing them to reference images can help identify such distortions.

Image Blur: Assessing the level of blurriness in captured images can provide insights into the cleanliness of the lens. A smudged lens may result in reduced image sharpness and increased blurriness.

Flare Detection: Flare refers to unwanted light reflections or artifacts caused by smudges or dirt on the lens. Detecting and analyzing flare patterns in captured images can help identify the presence of a smudged lens.

Amount of Time Spent Using the Device: An electronic device that is used all day is more likely to be dirty that one that hasn't moved.

Location Data: If a user is traveling toward a landmark, national park, or other site of interest, they will likely be taking photos. Accordingly, in one or more embodiments systems configured as described can preemptively notify the user to clean the lens.

By incorporating these additional factors into the multi-factor assessment, the system can enhance its ability to accurately detect and notify users about the cleanliness of the image capture device cover. This comprehensive approach ensures that even subtle smudges or dirt on the lens are detected, allowing users to take appropriate cleaning actions and maintain optimal image quality.

Figure 13:
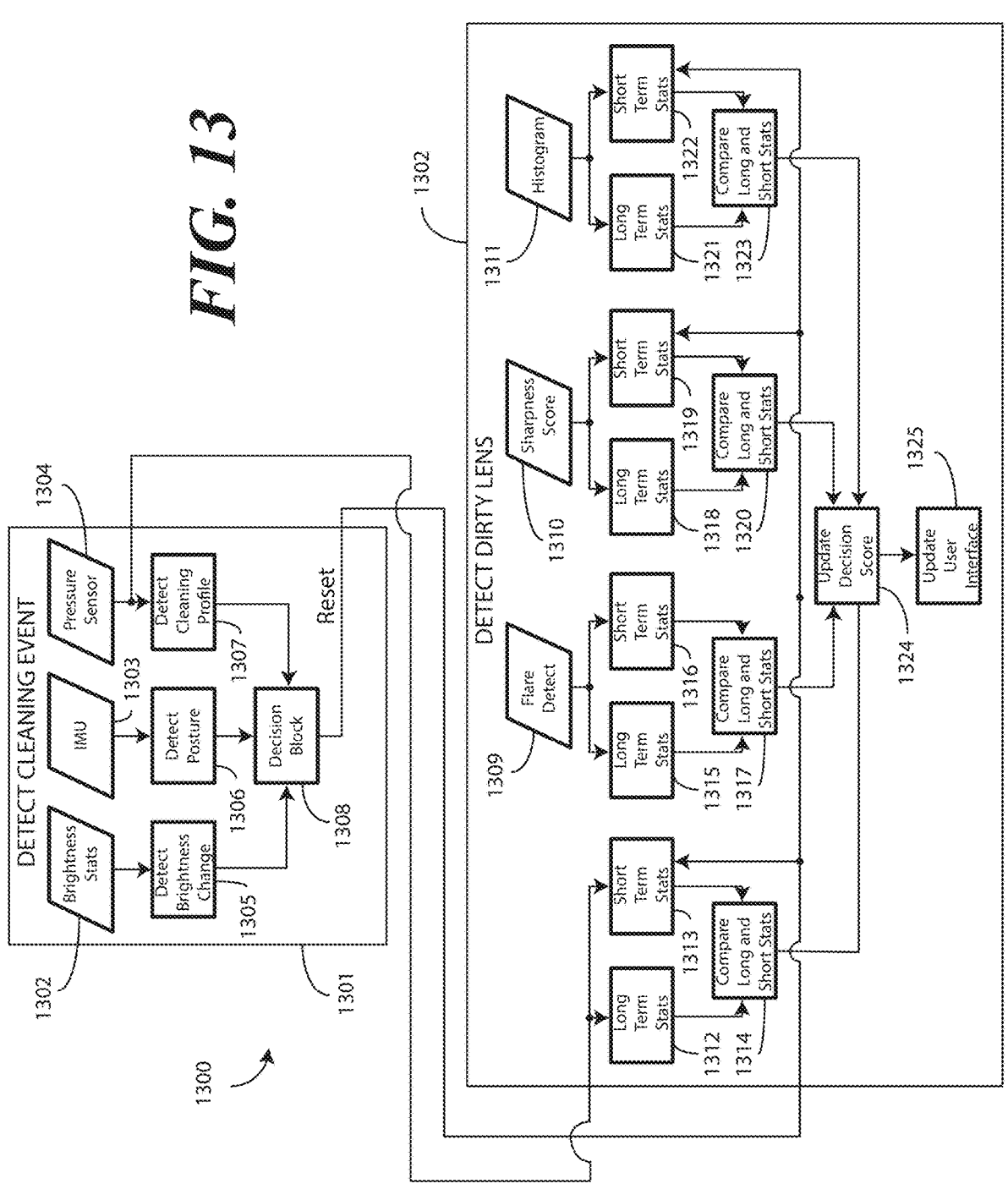
FIG. 13 illustrates one explanatory system in accordance with one or more embodiments of the disclosure.

Turning now to FIG. 13, illustrated therein is one explanatory decision algorithm 1300 for determining whether an image capture device cover is dirty or smudged in accordance with one or more embodiments of the disclosure. FIG. 13 illustrates a system that utilizes various factors to determine if a lens is smudged. The components and processes depicted in this figure contribute to the overall assessment of the image capture device cover's cleanliness.

The detect cleaning event 1301 component is responsible for detecting when a cleaning operation is performed on the image capture device cover. This can be achieved through various techniques, such as monitoring user inputs or analyzing changes in sensor data. In one or more embodiments, this component performs an image capture device cover cleaning operation using a multi-factor assessment that receives data including brightness statistics 1302 to detect changes in brightness 1305, motion data form an inertial measurement unit 1303 to detect a posture 1306 of the electronic device, and measurements of pressure from a pressure sensor 1304 to detect a cleaning profile 1307, examples of which were described above with reference to FIG. 12. When decision bloc 1308 determines that a cleaning operation has occurred, a reset signal can be delivered to long term 1312 and short-term statistics 1313, which are compared 1314, in the detect smudged image capture device cover 1302 component, which can be compared to perform the image capture device cover cleaning operation confirmation process.

In one or more embodiments, the detect smudged image capture device cover 1302 component considers a measurement of flare 1309 that compares 1317 measurements of one or more recent images 1316 with other measurements of one or more previous images 1315 to determine if there has been a substantial, recent change in the amount of flare seen by the image capture device sensor. Similarly, the sharpness score 1310 of one or more recent images 1319 with other scores of one or more previous images 1318 can be compared 1320 to see if sharpness as recently, markedly decreased. In a similar fashion, the histograms 1311 from recent images 1321 and previous images 1322, examples of which were described above with reference to FIG. 9, can be compared 1323 in the multi-factor assessment occurring in the detect smudged image capture device cover 1302 component.

A decision score 1324 can be calculated. In one or more embodiments, when the decision score 1324 from the multi-factor assessment exceeds a threshold, indicia 1325 can be presented on the user interface of an electronic device indicating that the lens or image capture device cover is likely smudged or dirty.

Figure 14:
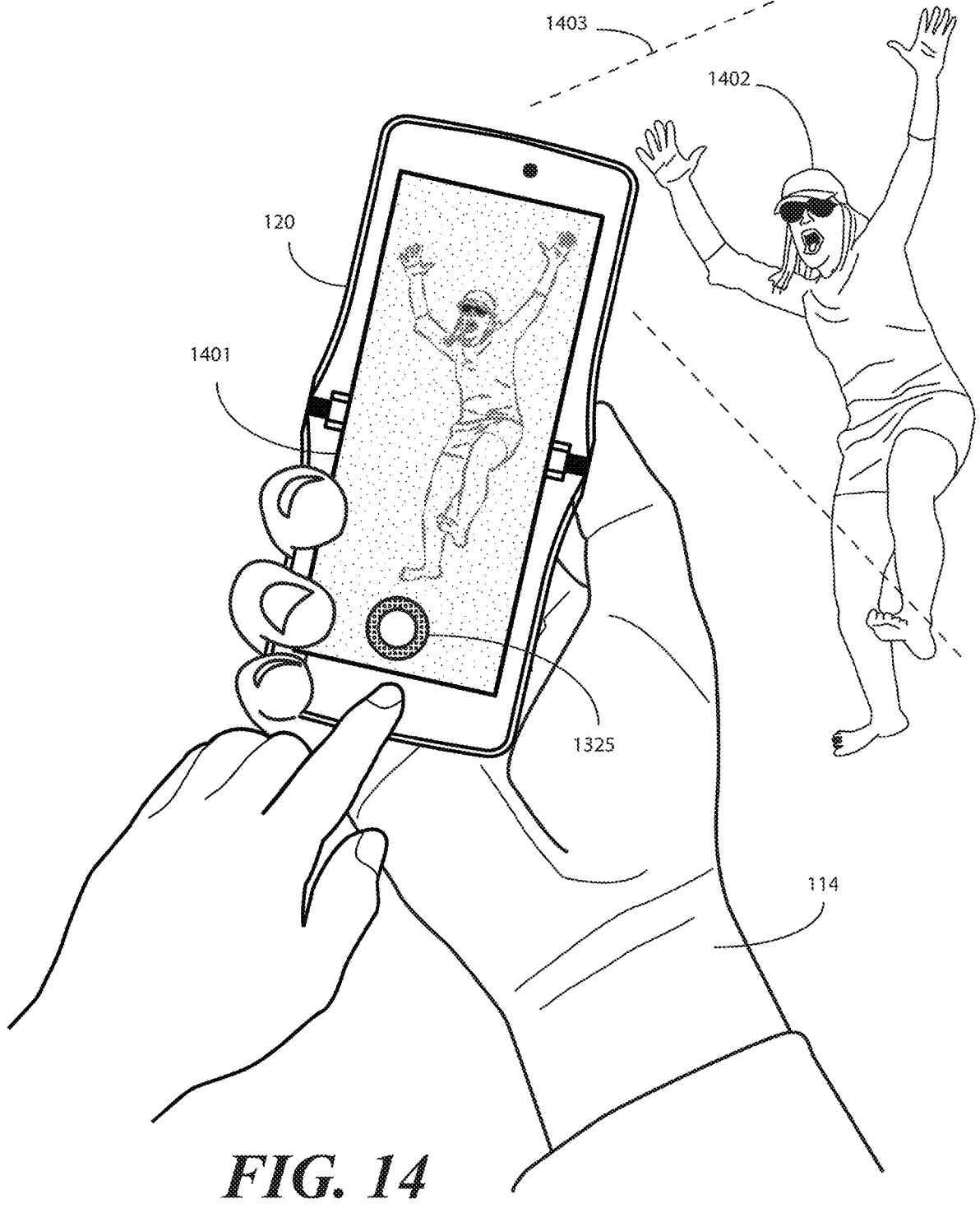
FIG. 14 illustrates one explanatory electronic device configured in accordance with embodiments of the disclosure in use when the cover of an image capture device is smudged.

Turning now to FIG. 14, illustrated therein is an example of such indicia 1325. As shown, the user 2114 is using the electronic device 120 to capture one or more images 1403 of a subject 1402. However, the image capture device cover is smudged, which renders the preview image cloudy and blurry on the user interface 1401. Using the explanatory decision algorithm (1300) for determining whether an image capture device cover is dirty or smudged in accordance with one or more embodiments of the disclosure described above in FIG. 13, one or more processors of the electronic device 120 detect this and present indicia 1325 indicating that the image capture device cover is smudged on the user interface 1401. In this illustrative embodiment, so as to be discreet and not "in your face," the indicia 1325 indicating that the image capture device cover is smudged comprises a ring circumscribing a user actuation target that, when actuated, causes an image capture device situated beneath the image capture device cover to capture one or more images 1403. Other examples of indicia 1325 indicating that the image capture device cover is smudged will be obvious to those of ordinary skill in the art having the benefit of this disclosure.

Figure 15:
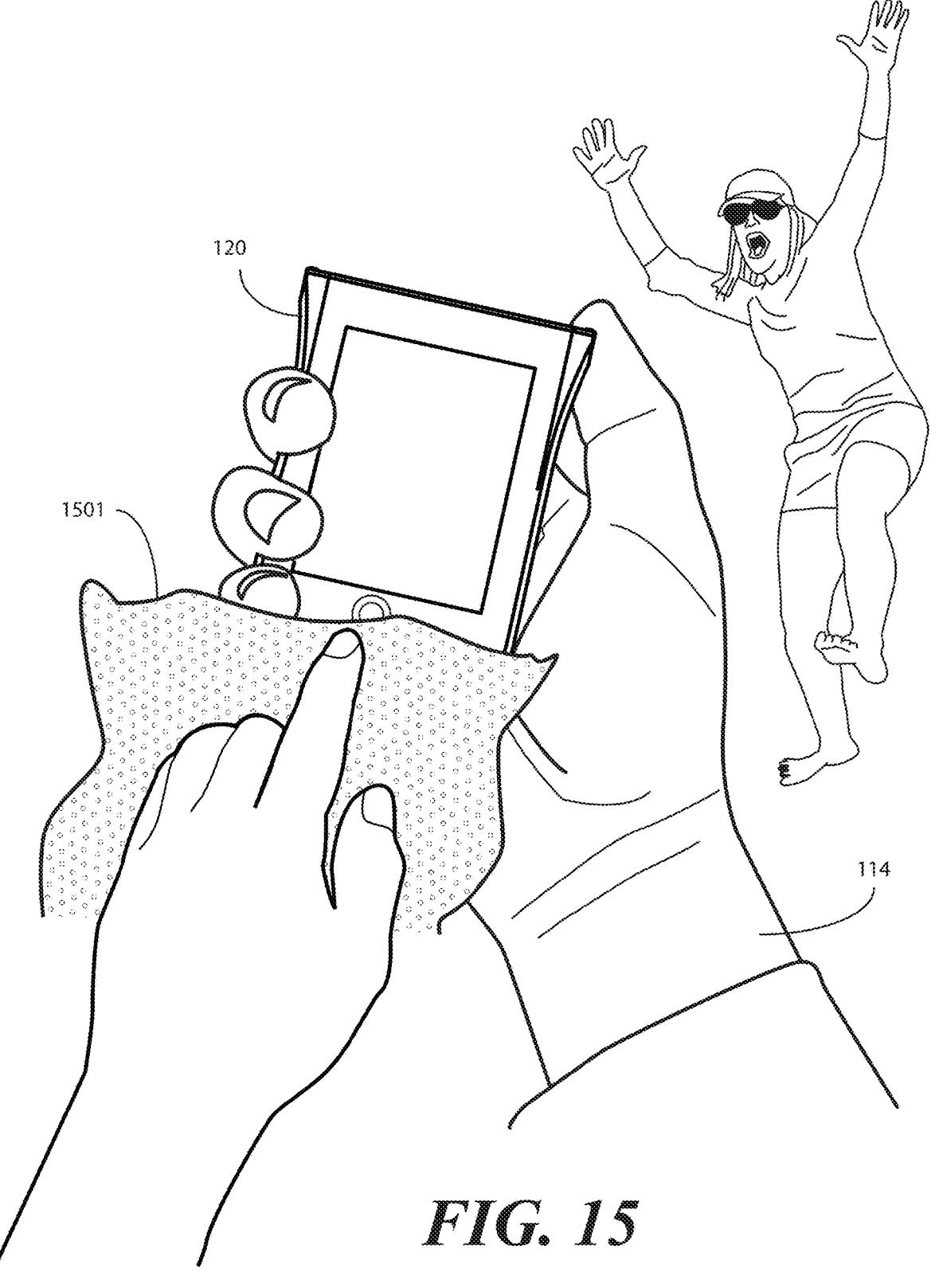
FIG. 15 illustrates one explanatory cleaning operation in accordance with one or more embodiments of the disclosure.
Figure 16:
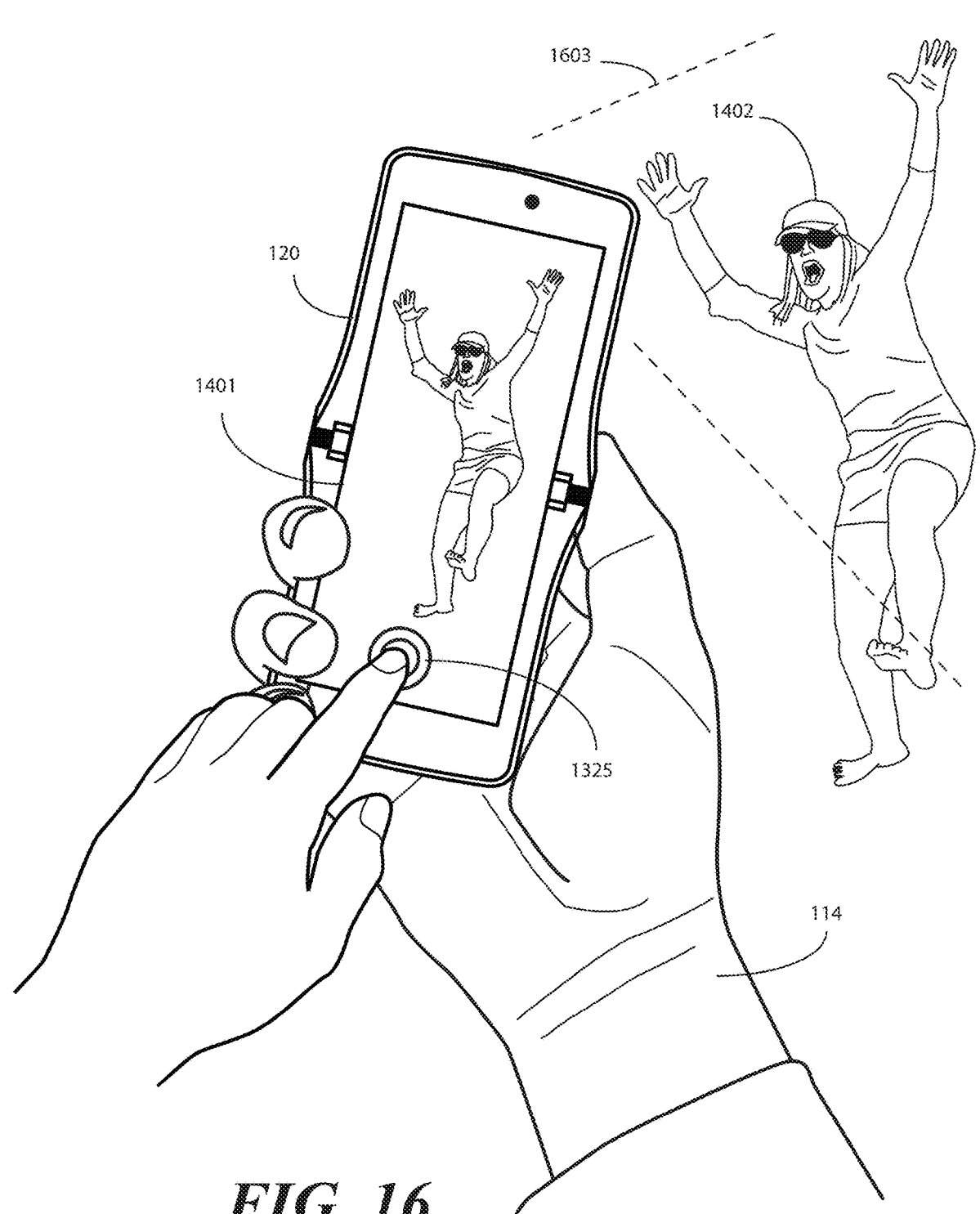
FIG. 16 illustrates one explanatory electronic device configured in accordance with embodiments of the disclosure in use when the cover of an image capture device is not smudged.

As shown in FIG. 15, the user 2114 cleans the image capture device of the electronic device 120 using a cleaning towel 1501. Using, for example, the motion data from orientation detectors (303) of FIG. 12, and/or the one or more processors detect the decision algorithm (1300) for determining whether an image capture device cover is dirty or smudged in accordance with one or more embodiments of the disclosure of FIG. 13, the one or more processors detect this cleaning operation and, accordingly, as shown in FIG. 16, alter the indicia 1325. indicating that the image capture device cover is smudged. In this example, the one or more processors alter the indicia 1325 indicating that the image capture device cover is smudged by changing its color. Other techniques for altering the indicia 1325 indicating that the image capture device cover is smudged will be obvious to those of ordinary skill in the art having the benefit of this disclosure. Advantageously, this allows the user 2114 to capture the one or more images 1603 of the subject 1402 in high quality, as indicated by the depictions presented on the user interface 1401.

Figure 17:
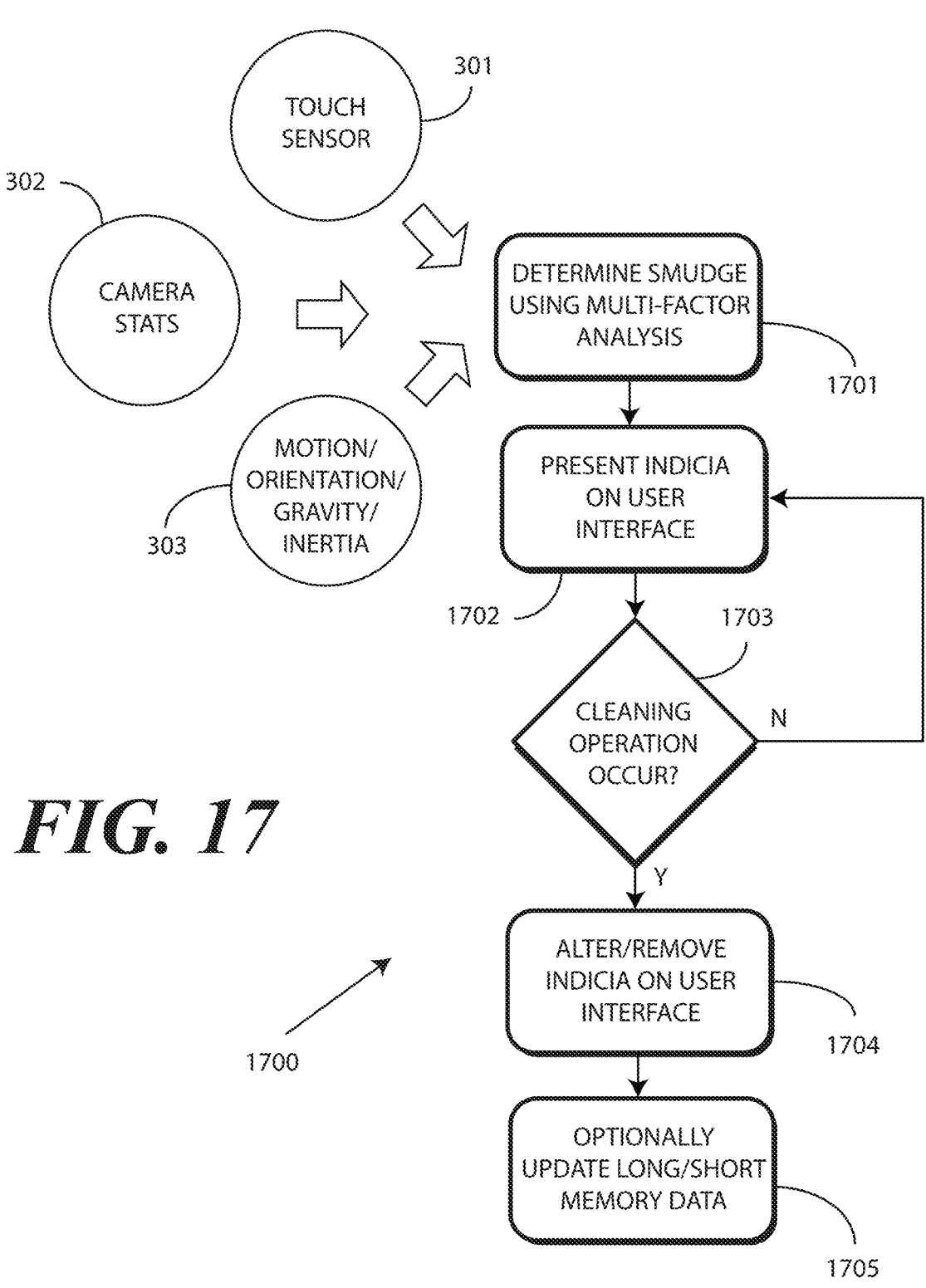
FIG. 17 illustrates one explanatory method in accordance with one or more embodiments of the disclosure.

Turning now to FIG. 17, illustrated therein is a method 1700 summarizing operation of an electronic device in accordance with one or more embodiments of the disclosure. Beginning at step 1701, one or more processors of the electronic device determine, from one or more sensors using a multi-factor assessment, whether an image capture device cover is smudged. In the illustrative embodiment of FIG. 17, the multi-factor assessment considers signals from a touch sensor 301, data 302 in the form of camera statistics, and signals from one or more motion and orientation detectors 303.

Figures 18, 19:
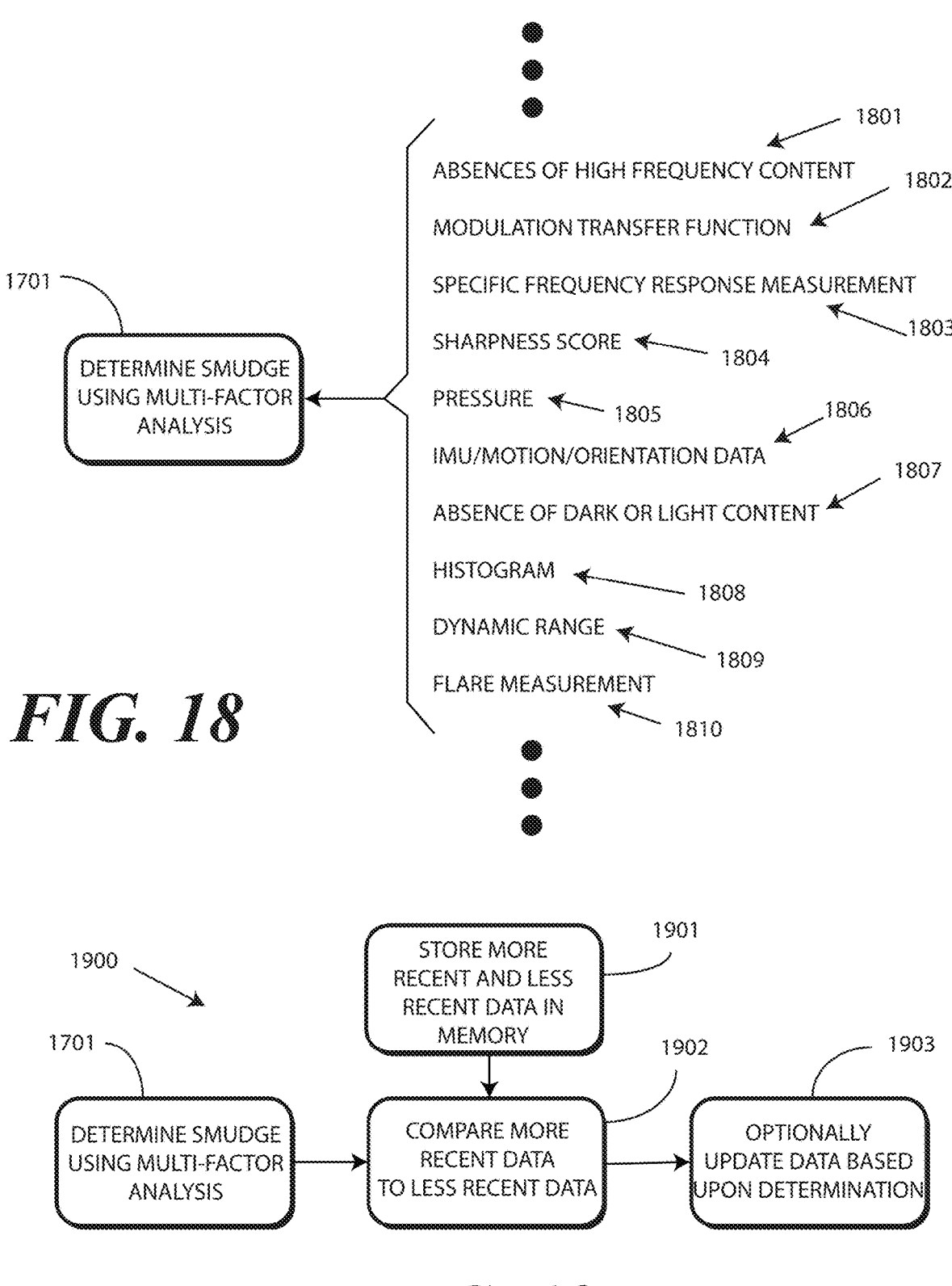
FIG. 18 illustrates one or more method steps in accordance with one or more embodiments of the disclosure.
FIG. 19 illustrates one explanatory method in accordance with one or more embodiments of the disclosure.

Turning briefly to FIG. 18, illustrated therein are some factors that can be used, alone or in combination, at step 1701. The components and steps depicted in this figure contribute to the overall functionality of the system.

The absence of high frequency content 1801 component analyzes the captured images to determine if there is a lack of high-frequency content. Smudges or dirt on the lens can cause a reduction in high-frequency details, resulting in a lower modulation transfer function (MTF) and a decrease in sharpness.

The modulation transfer function 1802 component measures the ability of the lens to transfer contrast at different spatial frequencies. By analyzing the modulation transfer function, the system can assess the quality and cleanliness of the lens.

The specific frequency response measurement 1803 component captures specific frequency response data to evaluate the lens's performance at different frequencies. Changes in the specific frequency response can indicate the presence of smudges or dirt on the lens.

The sharpness score 1804 component calculates a sharpness score based on the captured images. A decrease in sharpness may indicate the presence of a smudged lens, as smudges can affect image clarity and sharpness.

The pressure 1805 component represents the pressure applied to the image capture device cover. By measuring the pressure, the system can determine if the lens has been touched or cleaned.

The motion and orientation data 1806 component provides data on the device's motion and orientation. This data is used in combination with other factors to assess the cleanliness of the lens. For example, if the motion data indicates that the device has been moved or tilted, it may suggest that the lens has been touched or cleaned.

The absence of dark or light content 1807 component analyzes the captured images to determine if there is an absence of dark or light content. Smudges or dirt on the lens can affect the distribution of dark and light tones, resulting in an altered histogram.

The histogram 1808 component analyzes the tonal distribution in the captured images. Changes in the histogram can indicate the presence of a smudged lens, as smudges may affect the distribution of dark and light tones.

The dynamic range 1809 component measures the range of tones that can be captured by the image capture device. Changes in the dynamic range can indicate the presence of smudges or dirt on the lens.

The flare measurement 1810 component measures and analyzes flare in the captured images. Flare refers to unwanted light reflections or artifacts caused by smudges or dirt on the lens. By detecting and analyzing flare patterns, the system can identify the presence of a smudged lens.

Thus, step 1701 can determine if the lens is smudged based on the input from the various components and factors. This step 1701 can take into account factors such as the absence of high-frequency content, modulation transfer function, specific frequency response measurement, sharpness score, pressure, IMU/motion/orientation data, absence of dark or light content, histogram, dynamic range, and flare measurement. By analyzing factors such as high-frequency content, modulation transfer function, specific frequency response, sharpness score, pressure, motion data, absence of dark or light content, histogram, dynamic range, and flare measurement, the system can make an accurate assessment of the lens's cleanliness.

Turning now back to FIG. 17, at step 1702, when the multi-factor assessment indicates that the image capture device cover is smudged, the method 1700 causes a user interface of the electronic device to present indicia indicating that the image capture device cover is smudged. Decision 1703 then detects a cleaning operation occurring at the image capture device cover, or otherwise returns the method 1700 to step 1702. Step 1704 then comprises, in response to detecting the cleaning operation, altering the indicia indicating that the image capture device cover is smudged. Step 1705 can then update the stored data accordingly.

Turning now to FIG. 19, illustrated therein is a method 1900 that is a variation of the method (1700) of FIG. 17 that uses a comparison of more recent image data to previous image data to determine whether an image capture device cover is smudged or dirty. Once again, step 1701 comprises determining, from one or more sensors, whether an image capture device cover is smudged or dirty from a multi-factor assessment. As step 1901 has been storing more recent data and prior data (as shown above in FIG. 13), step 1902 can compare this data.

Comparing more recent image sensor data with less recent image sensor data at step 1902 can be a valuable technique for determining if the image capture device cover is smudged or dirty. By analyzing the differences between these two sets of data, the system can identify any changes that may indicate the presence of smudges or dirt on the lens.

One approach is to compare the sharpness scores at step 1902 calculated from the more recent and less recent image sensor data. The sharpness score is a measure of the image's clarity and sharpness, and a decrease in this score may suggest the presence of smudges or dirt on the lens. By comparing the sharpness scores over time, the system can detect any significant changes that may indicate a smudged or dirty lens.

Another approach is to analyze the histogram data of the more recent and less recent image sensor data at step 1902. The histogram represents the distribution of pixel intensities in an image. Changes in the histogram, such as shifts or abnormalities, can indicate the presence of smudges or dirt on the lens. By comparing the histograms of the more recent and less recent data, the system can identify any significant differences that may suggest a smudged or dirty lens.

Additionally, comparing the presence or absence of specific image features or patterns in the more recent and less recent image sensor data at step 1902 can provide insights into the cleanliness of the lens. For example, if certain features or patterns are consistently present in the less recent data but absent in the more recent data, it may indicate the presence of smudges or dirt that have affected the image quality.

By utilizing these comparisons at step 1902 between more recent and less recent image sensor data, the system can effectively detect changes in image quality that may be indicative of a smudged or dirty lens. This approach allows for continuous monitoring and assessment of the cleanliness of the image capture device cover, ensuring optimal image quality and user experience.

At optional step 1903, data can be updated based upon the comparison made at step 1902. Illustrating by example, in one or more embodiments step 1903 comprises resetting a portion of the memory of the electronic device storing the more recent image data when step 1902 determines that the image capture device cover has been cleaned.

Figure 20:
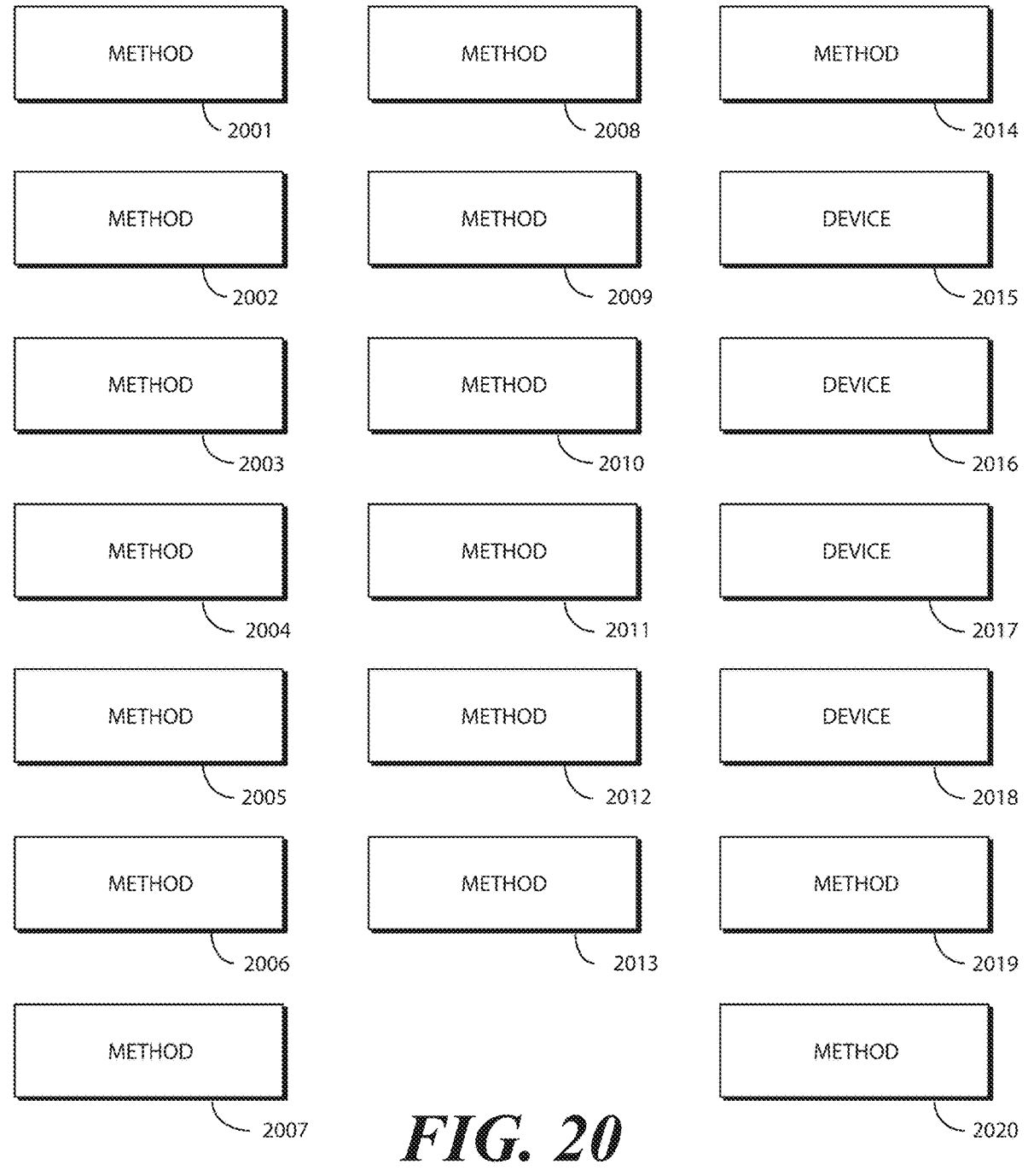
FIG. 20 illustrates various embodiments of the disclosure.

Turning now to FIG. 20, illustrated therein are various embodiments of the disclosure. The embodiments of FIG. 20 are shown as labeled boxes in FIG. 20 due to the fact that the individual components of these embodiments have been illustrated in detail in FIGS. 1-19, which precede FIG. 20. Accordingly, since these items have previously been illustrated and described, their repeated illustration is no longer essential for a proper understanding of these embodiments. Thus, the embodiments are shown as labeled boxes.

At 2001, a method in an electronic device comprises determining, by one or more processors, that an image capture device cover is smudged using a multi-factor assessment, wherein at least one factor of the multi-factor assessment comprises a measurement of pressure applied to the image capture device cover. At 2001, when the multi-factor assessment indicates that the image capture device cover is smudged, the method comprises causing, by the one or more processors, a user interface of the electronic device to present indicia indicating that the image capture device cover is smudged.

At 2002, the at least one other factor of the multi-factor assessment of 2001 comprises data received from an image sensor of an image capture device situated beneath the image capture device cover within the electronic device. At 2003, the data of 2002 comprises an absence of at least some high frequency content in one or more images captured by the image capture device when compared to one or more other images previously captured by the image capture device.

At 2004, the determining of 2003 comprises comparing at least one modulation transfer function associated with the one or more images captured by the image capture device with at least one other modulation transfer function associated with the one or more other images previously captured by the image capture device to determine whether the absence of the at least some high frequency content appears in the one or more images captured by the image capture device. At 2005, the determining of 2003 comprises comparing at least one specific frequency response measurement associated with the one or more images captured by the image capture device with at least one other specific frequency response measurement associated with the one or more other images previously captured by the image capture device to determine whether the absence of the at least some high frequency content appears in the one or more images captured by the image capture device.

At 2006, the data of 2002 comprises a sharpness score that is calculated, using the one or more processors, by capturing at least one image, passing image data associated with the at least one image simultaneously through a high pass filter to obtain filtered image data and a summation function to obtain summed image data, and dividing the filtered image data by the summed image data. At 2007 the data of 2002 comprises an absence of at least some dark and light tonal content in one or more images captured by the image capture device when compared to one or more other images previously captured by the image capture device.

At 2008, the determining of 2007 comprises comparing at least one histogram associated with the one or more images captured by the image capture device with at least one other histogram associated with the one or more other images previously captured by the image capture device to determine whether the absence of at least some dark and light tonal content appears in one or more images captured by the image capture device. At 2009, the determining of 2007 comprises comparing at least one dynamic range associated with the one or more images captured by the image capture device with at least one other dynamic range associated with the one or more other images previously captured by the image capture device to determine whether the absence of at least some dark and light tonal content appears in one or more images captured by the image capture device.

At 2010, the data of 2002 comprises a measurement of flare appearing in one or more images captured by the image capture device when compared to one or more other images previously captured by the image capture device. At 2011, at least one other factor of the multi-factor assessment of 2001 comprises one or more of motion data of the electronic device in three-dimensional space and/or orientation data of the electronic device in the three-dimensional space. At 2012, the indicia indicating that the image capture device cover is smudged of 2001 comprises a ring circumscribing a user actuation target that, when actuated, causes an image capture device situated beneath the image capture device cover to capture one or more images.

At 2013, the method of 2001 further comprises storing, by the one or more processors in a memory of the electronic device, both more recent image data from more recent images captured by an image capture device situated beneath the image capture device cover and less recent image data from less recent images captured by the image capture device. At 2013, the method comprises comparing, by the one or more processors, the more recent image data and the less recent image data to determine whether the image capture device cover is smudged.

At 2014, the method of 2013 further comprises detecting, by the one or more processors, that the image capture device cover has been cleaned using another multi-factor assessment comprising another measurement of pressure applied to the image capture device cover. At 2014, when the one or more processors detect that the image capture device cover has been cleaned, the method comprises resetting a portion of the memory of the electronic device storing the more recent image data.

At 2015, an electronic device comprises a device housing defining at least one aperture. At 2015, the electronic device comprises an image capture device situated within the device housing and having a field of view through the at least one aperture and an image capture device cover coupled to the device housing and spanning the at least one aperture.

At 2015, the electronic device comprises a pressure sensor positioned between the image capture device cover and the device housing. At 2015, the electronic device comprises a user interface and one or more processors operable with the image capture device, the pressure sensor, and the user interface.

At 2015, the one or more processors determine, from signals from both the image capture device and the pressure sensor, whether the image capture device cover is smudged using a multi-factor assessment. At 2015, when the multi-factor assessment indicates that the image capture device cover is smudged, the one or more processors cause the user interface of the electronic device to present indicia indicating that the image capture device cover is smudged.

At 2016, the device housing of 2015 defines at least one other aperture. At 2016, the electronic device comprises another image capture device situated within the device housing and having a field of view through the at least one other aperture. At 2016, the image capture device cover spans both the at least one aperture and the at least one other aperture and the pressure sensor is situated between the at least one aperture and the at least one other aperture.

At 2017, the electronic device of 2015 further comprises one or more motion and orientation detectors. At 2017, the one or more processors further determine, from other signals from the one or more motion and orientation detectors, whether the image capture device cover is smudged using the multi-factor assessment. At 2018, the one or more motion and orientation detectors of 2017 comprise one or more inertial measurement units carried by the device housing.

At 2019, a method in an electronic device comprises determining, by one or more processors from one or more sensors, that an image capture device cover is smudged using a multi-factor assessment. At 2019, when the multi-factor assessment indicates that the image capture device cover is smudged, the method comprises causing, by the one or more processors, a user interface of the electronic device to present indicia indicating that the image capture device cover is smudged.

At 2019, the method comprises detecting, by one or more processors using the one or more sensors, a cleaning operation occurring at the image capture device cover. At 2019, in response to detecting the cleaning operation, the method comprises altering the indicia indicating that the image capture device cover is smudged.

At 2020, the method of 2019 further comprises performing, by the one or more processors, an image capture device cover cleaning operation confirmation process using another multi-factor assessment of data received from an image capture device having a field of view extending through the image capture device cover. At 2020, when the image capture device cleaning operation confirmation process fails to confirm the cleaning operation occurred, the method comprises again presenting, by the one or more processors, the indicia indicating that the image capture device cover is smudged.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims.

Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. A method in an electronic device, the method comprising:

determining, by one or more processors, that an image capture device cover is smudged using a multi-factor assessment, wherein at least one factor of the multi-factor assessment comprises a measurement of pressure applied to the image capture device cover; and when the multi-factor assessment indicates that the image capture device cover is smudged, causing, by the one or more processors, a user interface of the electronic device to present indicia indicating that the image capture device cover is smudged.

2. The method of claim 1, wherein at least one other factor of the multi-factor assessment comprises data received from an image sensor of an image capture device situated beneath the image capture device cover within the electronic device.

3. The method of claim 2, wherein the data comprises an absence of at least some high frequency content in one or more images captured by the image capture device when compared to one or more other images previously captured by the image capture device.

4. The method of claim 3, wherein the determining comprises comparing at least one modulation transfer function associated with the one or more images captured by the image capture device with at least one other modulation transfer function associated with the one or more other images previously captured by the image capture device to determine whether the absence of the at least some high frequency content appears in the one or more images captured by the image capture device.

5. The method of claim 3, wherein the determining comprises comparing at least one specific frequency response measurement associated with the one or more images captured by the image capture device with at least one other specific frequency response measurement associated with the one or more other images previously captured by the image capture device to determine whether the absence of the at least some high frequency content appears in the one or more images captured by the image capture device.

6. The method of claim 2, wherein the data comprises a sharpness score, using the one or more processors, by capturing at least one image, passing image data associated with the at least one image simultaneously through a high pass filter to obtain filtered image data and a summation function to obtain summed image data, and dividing the filtered image data by the summed image data.

7. The method of claim 2, wherein the data comprises an absence of at least some dark and light tonal content in one or more images captured by the image capture device when compared to one or more other images previously captured by the image capture device.

8. The method of claim 7, wherein the determining comprises comparing at least one histogram associated with the one or more images captured by the image capture device with at least one other histogram associated with the one or more other images previously captured by the image capture device to determine whether the absence of at least some dark and light tonal content appears in one or more images captured by the image capture device.

9. The method of claim 7, wherein the determining comprises comparing at least one dynamic range associated with the one or more images captured by the image capture device with at least one other dynamic range associated with the one or more other images previously captured by the image capture device to determine whether the absence of at least some dark and light tonal content appears in one or more images captured by the image capture device.

10. The method of claim 2, wherein the data comprises a measurement of flare appearing in one or more images captured by the image capture device when compared to one or more other images previously captured by the image capture device.

11. The method of claim 1, wherein at least one other factor of the multi-factor assessment comprises one or more of motion data of the electronic device in three-dimensional space and/or orientation data of the electronic device in the three-dimensional space.

12. The method of claim 1, wherein the indicia indicating that the image capture device cover is smudged comprises a ring circumscribing a user actuation target that, when actuated, causes an image capture device situated beneath the image capture device cover to capture one or more images.

13. The method of claim 1, further comprising:
storing, by the one or more processors in a memory of the electronic device, both:
more recent image data from more recent images captured by an image capture device situated beneath the image capture device cover; and;
less recent image data from less recent images captured by the image capture device; and
comparing, by the one or more processors, the more recent image data and the less recent image data to determine whether the image capture device cover is smudged.

14. The method of claim 13, further comprising:
detecting, by the one or more processors, that the image capture device cover has been cleaned using another multi-factor assessment comprising another measurement of pressure applied to the image capture device cover; and
when the one or more processors detect that the image capture device cover has been cleaned, resetting a portion of the memory of the electronic device storing the more recent image data.

15. An electronic device, comprising:
a device housing defining at least one aperture;
an image capture device situated within the device housing and having a field of view through the at least one aperture;
an image capture device cover coupled to the device housing and spanning the at least one aperture;
a pressure sensor positioned between the image capture device cover and the device housing;
a user interface; and
one or more processors operable with the image capture device, the pressure sensor, and the user interface;
wherein the one or more processors determine, from signals from both the image capture device and the pressure sensor, whether the image capture device cover is smudged using a multi-factor assessment, and when the multi-factor assessment indicates that the image capture device cover is smudged, cause the user interface of the electronic device to present indicia indicating that the image capture device cover is smudged.

16. The electronic device of claim 15, wherein:
the device housing defines at least one other aperture;
the electronic device comprises another image capture device situated within the device housing and having a field of view through the at least one other aperture;
the image capture device cover spans both the at least one aperture and the at least one other aperture; and
the pressure sensor is situated between the at least one aperture and the at least one other aperture.

17. The electronic device of claim 15, further comprising one or more motion and orientation detectors, wherein the one or more processors further determine, from other signals from the one or more motion and orientation detectors, whether the image capture device cover is smudged using the multi-factor assessment.

18. The electronic device of claim 17, wherein the one or more motion and orientation detectors comprise one or more inertial measurement units carried by the device housing.

19. A method in an electronic device, the method comprising:
determining, by one or more processors from one or more sensors, that an image capture device cover is smudged using a multi-factor assessment, wherein at least one factor of the multi-factor assessment comprises a measurement of pressure;
when the multi-factor assessment indicates that the image capture device cover is smudged, causing, by the one or more processors, a user interface of the electronic device to present indicia indicating that the image capture device cover is smudged;
detecting, by one or more processors using the one or more sensors, a cleaning operation occurring at the image capture device cover; and
in response to detecting the cleaning operation, altering the indicia indicating that the image capture device cover is smudged.

20. The method of claim 19, further comprising:
performing, by the one or more processors, an image capture device cover cleaning operation confirmation process using another multi-factor assessment of data received from an image capture device having a field of view extending through the image capture device cover; and

when the image capture device cleaning operation confirmation process fails to confirm the cleaning operation occurred, again presenting, by the one or more processors, the indicia indicating that the image capture device cover is smudged.

\* \* \* \* \*